United States Patent
York

(10) Patent No.: US 8,630,314 B2
(45) Date of Patent: Jan. 14, 2014

(54) METHOD AND APPARATUS FOR SYNCHRONIZING MEASUREMENTS TAKEN BY MULTIPLE METROLOGY DEVICES

(75) Inventor: Frederick John York, Longwood, FL (US)

(73) Assignee: Faro Technologies, Inc., Lake Mary, FL (US)

(*) Notice: Subject to any disclaimer, the term of this patent is extended or adjusted under 35 U.S.C. 154(b) by 277 days.

(21) Appl. No.: 12/986,631

(22) Filed: Jan. 7, 2011

(65) Prior Publication Data

US 2011/0170534 A1    Jul. 14, 2011

Related U.S. Application Data

(60) Provisional application No. 61/296,555, filed on Jan. 20, 2010, provisional application No. 61/293,838, filed on Jan. 11, 2010.

(51) Int. Cl.
*H04J 3/06* (2006.01)

(52) U.S. Cl.
USPC .......................................................... 370/503

(58) Field of Classification Search
USPC ................. 370/503–520, 401–408, 465–473, 370/489–490
See application file for complete search history.

(56) References Cited

U.S. PATENT DOCUMENTS

| | | |
|---|---|---|
| 1,535,312 A | 4/1925 | Hosking |
| 1,918,813 A | 2/1932 | Kinzy |

(Continued)

FOREIGN PATENT DOCUMENTS

| | | |
|---|---|---|
| CN | 2236119 | 9/1996 |
| CN | 2508896 | 9/2002 |

(Continued)

OTHER PUBLICATIONS

Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].

(Continued)

*Primary Examiner* — Kwang B Yao
*Assistant Examiner* — Juvena Loo
(74) *Attorney, Agent, or Firm* — Cantor Colburn LLP

(57) ABSTRACT

Apparatus includes at least two devices that communicate with each other, wherein a first one of the at least two devices having an IEEE 1588 precision time protocol interface, the interface including one or more components configured for communications in both a wired manner and a wireless manner with a second one of the at least two devices. The second one of the at least two devices having an IEEE 1588 precision time protocol interface, the interface including one or more components configured for communications in both a wired manner and a wireless manner with the first one of the at least two devices. Wherein one of the at least two devices includes a master clock and the other one of the at least two devices includes a slave clock, wherein the master clock communicates a time to the slave clock and the slave clock is responsive to the communicated time from the master clock to adjust a time of the slave clock if necessary to substantially correspond to the time of the master clock, thereby time synchronizing the at least two devices together.

42 Claims, 29 Drawing Sheets

(56) References Cited

U.S. PATENT DOCUMENTS

| | | |
|---|---|---|
| 2,316,573 A | 4/1940 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 11/1959 | Littlejohn |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A * | 3/1999 | Terawaki et al. ............ 700/258 |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,339,410 B1 | 1/2002 | Milner et al. |
| 6,366,831 B1 | 4/2002 | Raab |
| 6,408,252 B1 | 6/2002 | De Smet |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 * | 10/2006 | del Prado Pavon et al. .... 368/46 |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |

(56) References Cited

U.S. PATENT DOCUMENTS

| | | |
|---|---|---|
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 * | 2/2010 | Rischar et al. .................. 368/46 |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,171,650 B2 | 5/2012 | York et al. |
| 8,276,286 B2 | 10/2012 | Bailey et al. |
| 8,284,407 B2 | 10/2012 | Briggs et al. |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 * | 7/2003 | Silvester ...................... 370/252 |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0115092 A1 | 6/2005 | Raab et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eidson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |

(56) References Cited

U.S. PATENT DOCUMENTS

| | | |
|---|---|---|
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0164114 A1 | 7/2011 | Kobayashi et al. |
| 2011/0173827 A1 | 7/2011 | Bailey et al. |
| 2011/0173828 A1 | 7/2011 | York |
| 2011/0178755 A1 | 7/2011 | York |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0062243 A1 | 3/2013 | Chang et al. |
| 2013/0097882 A1 | 4/2013 | Bridges et al. |
| 2013/0125408 A1 | 5/2013 | Atwell et al. |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 | 1/2008 |
| DE | 102008039838 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 A1 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 A2 | 12/2006 |
| EP | 1429109 B1 | 4/2007 |
| EP | 1764579 B1 | 12/2007 |
| EP | 1878543 | 1/2008 |
| EP | 1967930 A2 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 | 2/2009 |
| GB | 2452033 A | 2/2009 |
| JP | 5581525 | 6/1955 |
| JP | S575584 | 1/1982 |
| JP | 5827264 | 2/1983 |
| JP | S59133890 | 8/1984 |
| JP | 6313710 A | 8/1994 |
| JP | 6313710 A | 11/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 A1 | 8/2005 |
| WO | 2005075875 | 8/2005 |
| WO | 2005100908 A1 | 10/2005 |

(56) References Cited

FOREIGN PATENT DOCUMENTS

| | | | |
|---|---|---|---|
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 A2 | 3/2008 |
| WO | 2008047171 | 4/2008 |
| WO | 2008064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011057130 A2 | 5/2011 |
| WO | 2012038446 A1 | 3/2012 |

OTHER PUBLICATIONS

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.

Jasperneite, et al., Enhancements to the Time Synchronization Standard IEEE-1588 for a System of Cascaded Bridges, IEEE, 2004.

Spada, et al., IEEE 1588 Lowers Integration Costs in Continuous Flow Automated Production Lines, XP-002498255, ARC Insights, Insight # 2003-33MD&H, Aug. 20, 2003.

Cho, et al., Implementation of a Precision Time Protocol over Low Rate Wireless Personal Area Networks, IEEE, 2008.

International Search Report for International Application No. PCT/US2011/020625; Date of Mailing Feb. 25, 2011.

Sauter, et al., Towards New Hybrid Networks for Industrial Automation, IEEE, 2009.

Written Opinion of the International Searching Authority for International Application No. PCT/US2011/020625; Filed Jan. 10, 2011.

Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].

HYDROpro Navigation, Hydropgraphic Survey Software, Trimble, www.trimble.com, Copyright 1997-2003.

Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].

International Preliminary Report on Patentability for International Application Serial No. PCT/US2011/021246 International filing date Jan. 14, 2011. Date of Issuance Jul. 24, 2012.

International Preliminary Report on Patentability for International Application Serial No. PCT/US2011/021249 International filing date Jan. 14, 2011. Date of Issuance Jul. 24, 2012.

International Preliminary Report on Patentability for International Application Serial No. PCT/US2011/021250 International filing date Jan. 14, 2011. Date of Issuance Jul. 24, 2012.

International Preliminary Report on Patentability for International Application Serial No. PCT/US2011/021252 International filing date Jan. 14, 2011. Date of Issuance Jul. 24, 2012.

International Preliminary Report on Patentability for International Application Serial No. PCT/US2011/021247 International filing date Jan. 14, 2011. Date of Issuance Jul. 24, 2012.

International Preliminary Report on Patentability for International Application Serial No. PCT/US2011/021259. International filing date Jan. 14, 2011. Date of Issuance Jul. 24, 2012.

International Preliminary Report on Patentability for International Application Serial No. PCT/US2011/021262. International filing date Jan. 14, 2011. Date of Issuance Jul. 24, 2012.

International Preliminary Report on Patentability for International Application Serial No. PCT/US2011/021263. International filing date Jan. 14, 2011. Date of Issuance Jul. 24, 2012.

International Preliminary Report on Patentability for International Application Serial No. PCT/US2011/021264. International filing date Jan. 14, 2011. Date of Issuance Jul. 24, 2012.

International Preliminary Report on Patentability for International Application Serial No. PCT/US2011/021270. International filing date Jan. 14, 2011. Date of Issuance Jul. 24, 2012.

International Preliminary Report on Patentability for International Application Serial No. PCT/US2011/021272. International filing date Jan. 14, 2011. Date of Issuance Jul. 24, 2012.

International Preliminary Report on Patentability for International Application Serial No. PCT/US2011/021273. International filing date Jan. 14, 2011. Date of Issuance Jul. 24, 2012.

International Preliminary Report on Patentability for International Application Serial No. PCT/US2011/021276. International filing date Jan. 14, 2011. Date of Issuance Jul. 24, 2012.

International Preliminary Report on Patentability for International Application Serial No. PCT/US2011/021278. International filing date Jan. 14, 2011. Date of Issuance Jul. 24, 2012.

International Preliminary Report on Patentability for International Application Serial No. PCT/US2011/021794. International filing date Jan. 20, 2011. Date of Issuance Jul. 24, 2012.

International Preliminary Report on Patentability for International Application Serial No. PCT/US2011/020625; International Filing Date of Jan. 10, 2011. Date of Issuance Jul. 17, 2012.

International Search Report for International Application No. PCT/US2011/021247 mailed Aug. 26, 2011.

Written Opinion of the International Searching Authority for International Application No. PCT/US2011/021247 mailed Aug. 26, 2011.

A. Hart; "Kinematic Coupling Interchangibility" Precision Engineering; vol. 28, No. 1; Jan. 1, 2004 pp. 1-15.

ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).

International Search Report for International Application No. PCT/US2011/021248 mailed Sep. 19, 2011.

International Search Report for International Application No. PCT/US2011/021253 mailed Sep. 26, 2011.

International Search Report for International Application No. PCT/US2011/021794 mailed Sep. 23, 2011.

Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.

Written Opinion of the International Searching Authority for International Application No. PCT/US2011/021248 mailed Sep. 19, 2011.

Written Opinion of the International Searching Authority for International Application No. PCT/US2011/021253 mailed Sep. 26, 2011.

Written Opinion of the International Searching Authority for International Application No. PCT/US2011/021794 mailed Sep. 23, 2011.

Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.

International Search Report for International Application No. PCT/US2011/021246 mailed Apr. 12, 2011.

International Search Report for International Application No. PCT/US2011/021249 mailed Apr. 21, 2011.

(56) References Cited

OTHER PUBLICATIONS

Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021278 mailed May 25, 2011.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion of the International Searching Authority for International Application No. PCT/US2011/021278 mailed May 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT/US2011/021276 mailed May 17, 2011.
International Search Report for International Application No. PCT/US2011/021273 mailed Apr. 20, 2011.
Written Opinion of the International Searching Authority for International Application No. PCT/US2011/021273 mailed Apr. 20, 2011.
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
German Patent Application No. 11 2011 100 291.2 dated Dec. 20, 2012.
International Preliminary Report on Patentability for International Application No. PCT/US2011/021253; Date of Completion May 9, 2012.
International Preliminary Report on Patentability for International Application No. PCT/US2011/021274; Date of Completion Apr. 12, 2012.
GoMeasure3D—Your source for all things measurement, Baces 3D 100 Series Portable CMM from GoMeasure3D, [online], [retrieved on Nov. 29, 2011], http://www.gomeasure3d.com/baces100.html.
It is Alive in the Lab, Autodesk University, Fun with the Immersion MicroScribe Laser Scanner, [online], [retrieved on Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved on Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
Kreon Laser Scanners, Getting the Best in Cutting Edge 3D Digitizing Technology, B3-D MCAD Consulting/Sales [online], [retrieved on Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Laser Reverse Engineering with MicroScribe, [online], [retrieved on Nov. 29, 2011], http://www.youtube.com/watch?v=8VRz_2aEJ4E&feature=PlayList&p=F63ABF74F30DC81B&playnext=1&playnext_from=PL&index=1.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
Information on Electro-Optical Information Systems; EOIS 3D Mini-Moire C.M.M. Sensor for Non-Contact Measuring & Surface Mapping; Direct Dimensions, Jun. 1995.
International Serach Report for International Application No. PCT/US2011/050787; Mailing date Mar. 11, 2011.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Written Opinion for International Patent Application for PCT/US2011/050787; Mailing Date Mar. 11, 2011.
Written Opinion of the International Searching Authority for International Application No. PCT/US2011/021253 mailed Mar. 22, 2012.
German Office Action and English Language summary for DE 112011100292.0 filed Jul. 3, 2012, based on PCT Application US2011/021252 filed Jan. 14, 2011.
Examination Report under Section 18(3); Report dated Oct. 31, 2012; Application No. GB1210309.9.
Examination Report under Section 18(3); Report dated Nov. 1, 2012; Application No. GB1210311.5.
Examination Report under Section 18(3); Report dated Nov. 6, 2012; Application No. GB1210306.5.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
Examination Report for German Application No. 11 2011 100 290.4 Report dated Jul. 16, 2013; based on PCT/US2011/021247.
P Ben-Tzvi, et al "Extraction of 3D Images Using Pitch-Actuated 2D Laser Range Finder for Robotic Vision" (6 pages) BNSDOCID <XP 31840390A_1_>.
International Search Report of the International Searching Authority for International Application No. PCT/US/2013/041826; Mailed Jul. 29, 2013.

(56) References Cited

OTHER PUBLICATIONS

International Search Report of the International Searching Authority for International Application No. PCT/US2013/040309; Mailed Jul. 15, 2013.
International Search Report of the International Searching Authority for International Application No. PCT/US2013/040321; Mailed Jul. 15, 2013.
International Search Report of the International Searching Authority for International Application No. PCT/US2013/022186; Mailed May 29, 2013.
YK Cho, et al. "Light-weight 3D LADAR System for Construction Robotic Operations" (pp. 237-244); 26th International Symposium on Automation and Robotics in Construction (ISARC 2009).
Romer "Romer Measuring Arms Portable CMMs for R&D and shop floor" (Mar. 2009) Hexagon Metrology (16 pages).
Written Opinion of the International Searching Authority for International Application No. PCT/US/2013/041826; Mailed Jul. 29, 2013.
Written Opinion of the International Searching Authority for International Application No. PCT/US2013/040309; Mailed Jul. 15, 2013.
Written Opinion of the International Searching Authority for International Application No. PCT/US2013/022186; Mailed May 29, 2013.
Written Opinion of the International Searching Authority for International Application No. PCT/US2013/040321; Mailed Jul. 15, 2013.

* cited by examiner

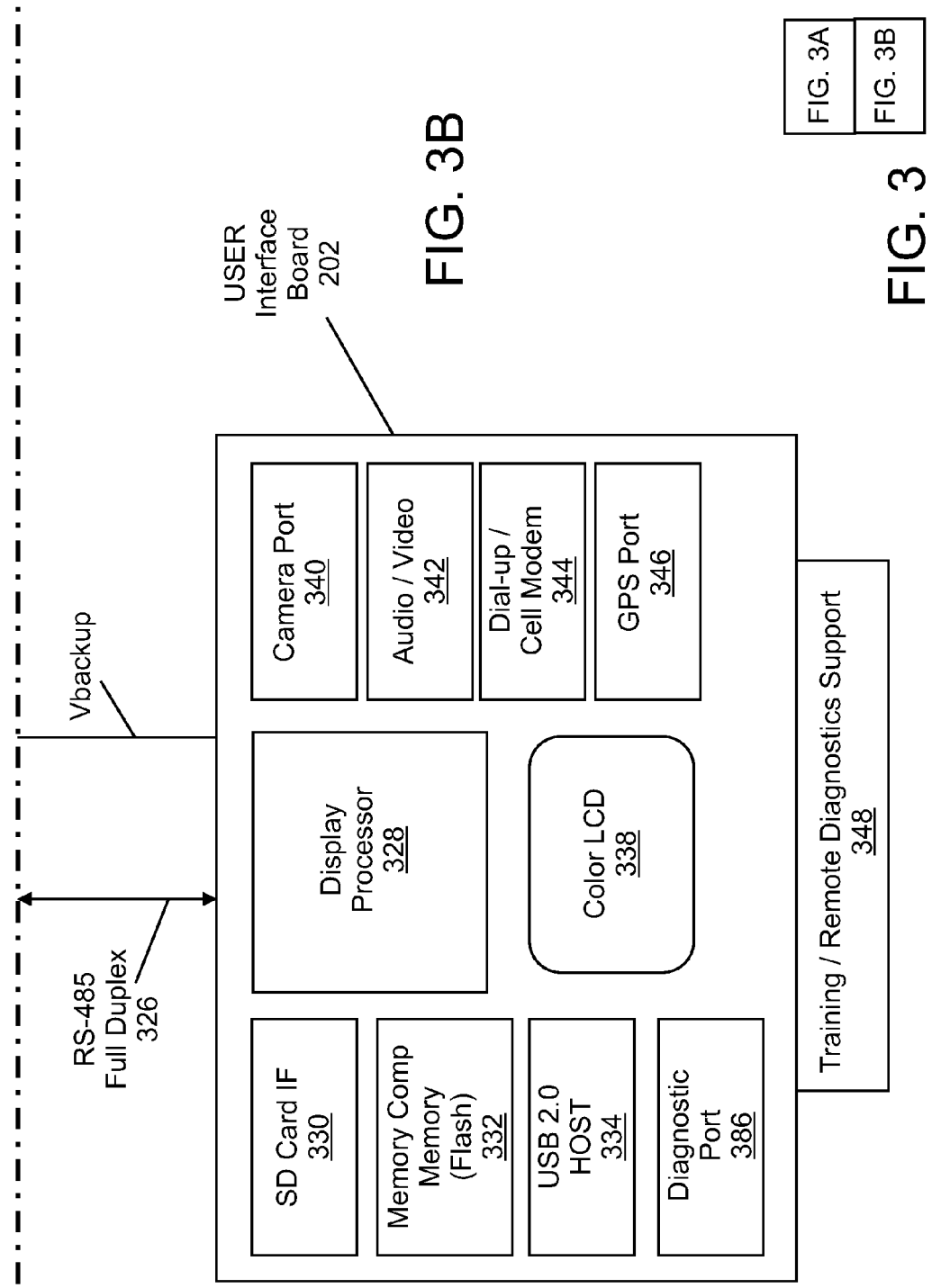

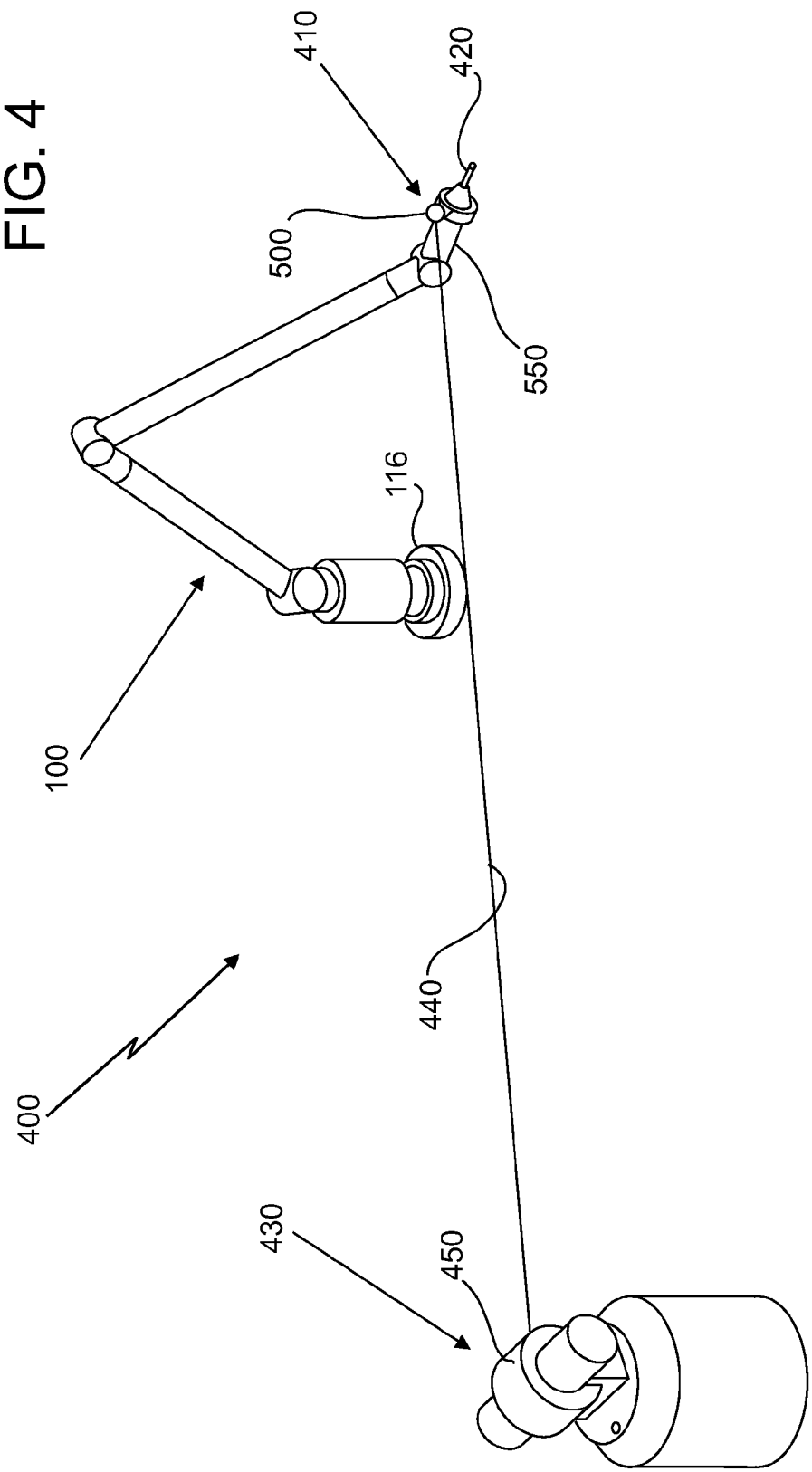

| FIG. 20A |
|----------|
| FIG. 20B |

METHOD AND APPARATUS FOR SYNCHRONIZING MEASUREMENTS TAKEN BY MULTIPLE METROLOGY DEVICES

CROSS-REFERENCE TO RELATED APPLICATIONS

The present application claims the benefit of provisional application No. 61/293,838 filed Jan. 11, 2010, and provisional application 61/296,555 filed Jan. 20, 2010, the contents of each of which are hereby incorporated by reference in their entirety.

BACKGROUND

The invention relates generally to the time synchronization of measurements taken by multiple measurement devices, and more particularly to the time synchronization of measurements taken by multiple metrology devices such as articulated arm coordinate measuring machines, laser trackers, laser scanners, and other types of parts measurement precision metrology devices.

For example, one of these metrology devices may belong to a class of instruments that measure the coordinates of each of a number of points on an object or part to be measured by probing the point with an articulated mechanical structure. The probing may be performed with a contacting mechanical probe tip and/or with a non-contacting scanning device (e.g., a laser line probe (LLP)). The position of the probe tip or scanning device relative to the base of the structure (i.e., in a certain coordinate frame of reference) is determined by the readings of angular encoders located at the connection points (e.g., bearing cartridges) of the articulating arm segments. This type of device, whether it uses a mechanical probe tip or a scanner, is referred to as an articulated arm coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Another type of these devices may be an instrument, referred to as a laser tracker, which measures the coordinates of a point by sending a laser beam to a retroreflector target that is in contact with the point. The laser tracker determines the coordinates of the point by measuring the distance and the two angles to the retroreflector. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems belonging to this class of instruments are described by U.S. Pat. No. 4,790,651 to Brown et al. and U.S. Pat. No. 4,714,339 to Lau et al.

A laser tracker can measure relatively large parts (i.e., parts larger than what a portable AACMM can measure without relocation of the AACMM) and in a shorter amount of time as compared to a portable AACMM, especially if the portable AACMM must be relocated to completely measure the part. Modern laser trackers can measure relatively large parts with 3-D single-point accuracy to 0.001 inches. Such a laser tracker typically uses its laser to measure the 3-D coordinates or a point at a range of up to 230 ft (70 m) by following the movement of a retroreflector such as a spherically mounted retroreflector (SMR) and report on the measured position in real time. Some modern laser trackers can provide real time updates of SMR positions.

There are several types of laser scanners, but all types project light onto objects to be tested or measured. Most surfaces of these objects are diffusely scattering, and measurements are ordinarily made without the assistance of a cooperative target such as a retroreflector. Some scanners, such as the one that attaches to the end of the AACMM described above (e.g., an LLP), are moved by hand and the laser light is directed over a surface of the object. The contacting probe of the portable AACMM and the non-contacting laser line probe can digitize data interchangeably without having to remove either component from the AACMM. A laser line probe provides multiple sampling points to be taken simultaneously along an object's surface, which is illuminated by the laser scan line. Users can accurately measure prismatic features with the AACMM contacting probe, then laser scan sections requiring larger amounts of data (detailed feature extraction) at more than 19,000 points per-second—without adding or removing attachments. An exemplary non-contacting scanner of this type is described in commonly assigned U.S. Pat. No. 6,965,843 to Raab et al., which is incorporated herein by reference in its entirety.

Other scanners are stationary and illuminate an entire area of interest. An exemplary scanner of this type is described in U.S. Pat. No. 7,599,071 to Dillon et al. A third type of laser scanner sends a laser beam over a scan pattern that covers a large volume. A laser scanner of this type may sometimes measure the 3-D coordinates of a relatively large volume within a few minutes. An exemplary laser scanner of this type is described in commonly assigned U.S. Pat. No. 7,430,068 to Becker et al., which is incorporated by reference herein in its entirety.

There are many situations in which multiple metrology devices, either all of the same type or of different types, being connected, arranged or combined in a distributed networked system, may benefit from being synchronized in time to one another. In general, as distributed network technologies increase in number and complexity, these system technologies applied to measurement and control become more complex as the number of nodes (i.e., metrology devices) in the system increases. It has become common to utilize local real time clocks in the various devices to achieve relatively accurate system-wide time. However, each of these individual clocks tends to drift apart from one another (i.e., lose their system-wide synchronization) due to, for example, initial frequency offsets, instabilities in the clock oscillators and environmental conditions such as temperature, aging, vibration, mechanical stresses, etc. As such, the measurements taken by these various devices and any resulting control imparted to the overall system suffer from the time inaccuracies of the individual clocks. Thus, some type of clock time synchronization correction or adjustment is needed to properly synchronize the individual clocks to thereby maintain an accurate and common measure of system-wide time.

The following outlines five examples in which precise time synchronization benefits system combinations of precision metrology devices.

Tracker and Arm: The portable AACMM is capable of being moved or positioned into a variety of different orientations. Because of this, the portable AACMM is able to measure "hidden" points; that is, points that are hidden from a line-of-sight view of a measuring device such as a laser tracker. On the other hand, the laser tracker can measure over a much larger volume than the AACMM. It is possible to use a laser tracker to relocate a portable AACMM by attaching a retroreflector to the arm portion of the AACMM. In this way the best features of each device are retained, while enabling the combined system to accurately measure hidden points over a relatively large volume.

An exemplary method for physically relocating the portable AACMM in this way is described in commonly assigned U.S. Pat. No. 7,804,602 to Raab, which is incorporated by reference herein in its entirety. To obtain the best possible relocation, it is important that the portable AACMM and the laser tracker be accurately synchronized in time to one another so that the corresponding measurements made by each device (e.g., of the position of the retroreflector) are accurately synchronized during the relocation process.

Simultaneous multilateration: By using the highly accurate distance meters (e.g., interferometers or absolute distance meters) of a multiple of laser trackers to simultaneously measure a single, wide-angle retroreflector target, the 3-D coordinates of the target can be measured to a relatively high degree of accuracy. It is desirable to make such a simultaneous multilateration measurement on a moving target. This enables the target to be moved over surfaces of objects of interest, thereby producing a map of the surface contours. To retain the relatively high accuracy obtained with this method, the multiple trackers must be accurately synchronized in time.

Wireless synchronization of scanner on end of AACMM: Advances in technology have caused a rapid increase in the rate of data collected by scanners attached to AACMMs, typically at the probe end. This increasing data rate is making it relatively more difficult to successfully transmit data from the scanner located at one end (e.g., the probe end) of the AACMM to the computing elements typically located within the base at the other end of the AACMM. A way around this problem is to send data wirelessly from the scanner to the computer or computing elements. For this wireless approach to be practical, it is important that the part measurement data from the scanner be accurately synchronized with probe positional data from the angular encoders within the AACMM.

Compensation and calibration of laser scanner: It is often necessary to compensate or calibrate a laser scanner of the type described above which sends a laser beam over a scan pattern that covers a relatively large volume. This type of scanner may sometimes measure 3-D coordinates of such a large volume within a few minutes. One way to do this is to compare readings of the scanner to those of a more accurate instrument such as a laser tracker. This may be done by placing a target on a carriage mounted on a motorized rail. The scanner is placed on one end of the rail and points its laser beam to a suitable diffuse target. A laser tracker is placed on the other end of the rail and points its laser beam to a suitable retroreflector target. The diffuse and retroreflector targets are placed back to back and face in opposite directions. To speed up the collection of data, it is desirable to collect data from both the scanner and the tracker while the target assembly is moving. This is only possible if the scanner and tracker are accurately synchronized.

Compensation of AACMM: It is possible to find compensation parameters of an AACMM by moving the arm segments of the articulated arm portion of the AACMM into a variety of different positions while a laser tracker follows a retroreflector target attached to the arm. Compensation parameters are found by comparing the 3-D readings from the laser tracker to readings of encoders in the AACMM. For this method to be practical, the arm segments must be moved into a wide variety of positions while the tracker records retroreflector position data at a relatively high rate. This method is accurate only if the laser tracker and the AACMM are accurately synchronized.

In all of the above example cases, what is needed is a way to synchronize the measurements taken between multiple metrology devices—in some cases, different types of multiple metrology devices, in other cases, similar types of multiple metrology devices.

Time synchronization is necessary and is already available within a portable AACMM. For example, the plurality of angular encoders used in an AACMM are sampled simultaneously. Similarly, the laser interferometer and absolute distance meter in a laser tracker are sampled in such a way that measurement results for each correspond to the same instants in time. Such synchronization is relatively easy to do in a single piece of equipment as a common clock is available. However, this situation changes when multiple portable AACMMs and/or other measurement devices are used in a coordinated measurement manner. In this case, typically a master clock is provided and a means by which the devices are synchronized to the master clock is also provided.

Previous methods of time synchronization of precision measurement devices have an inherent problem of a relatively large and unacceptable synchronization error. To demonstrate the problems created by synchronization error, consider the case where the time error is one millisecond in synchronization. If one of the measurement devices in a system of multiple measurement devices is a laser tracker measuring a retroreflector moving at one meter per second, the resultant error in measured distance is one millimeter. However, if an accuracy of ten micrometers is needed, the error is one hundred times larger than acceptable. Also, for that situation (as in a prior art case) without any synchronization of the clocks driving the individual metrology devices, the fact that a measurement has to wait for the respective "sync" signals to occur introduces additional synchronization delays. For example, an additional millisecond may be added to the total propagation delay.

For example, one prior art system used one laser tracker as a master tracker and a second laser tracker as a slave tracker. The master sent out a strobe signal that was received by the slave. The strobe was sent through cable drivers and was intercepted by receivers in the tracker. This signal went to a microprocessor that implemented a measurement task on that slave tracker as well as the master tracker. This process caused about one millisecond of delay. Cable propagation and capacitance/resistance of the circuit components accounted for much of this delay.

The IEEE 1588 precision time protocol (PTP), which implements a master clock in a phase locked loop manner, has also been proposed for use in robotics, for example as discussed in U.S. Published Patent Application No. 2006/0287769 to Yanagita. However, Yanagita at paragraph [0007] does not in fact recommend use of IEEE 1588. Instead, Yanagita states that IEEE 1588 requires specialized and expensive hardware, and instead proposes a programmed software solution using a master and slave tick count for synchronization of two or more robotic arms. In general, robotic devices used in manufacturing seldom have a need to achieve the 500 ns (nanosecond) time synchronization accuracy required by metrology instruments for applications of the types described above. Thus, the fields of robotics and metrology do not have as much in common as a cursory examination might suggest.

What is needed is apparatus and a method for relatively precise time synchronization (e.g., 500 nanoseconds maximum) of the real time clocks within a multiple of similar or different metrology devices using the IEEE 1588 precision time protocol (PTP), to thereby precisely synchronize the measurements taken by the metrology devices to a desired, relatively high level of accuracy.

SUMMARY OF THE INVENTION

According to embodiments of a first aspect of the of the present invention, apparatus includes at least two devices that communicate with each other, wherein a first one of the at least two devices having an IEEE 1588 precision time protocol interface, the interface including one or more components configured for communications in both a wired manner and a wireless manner with a second one of the at least two devices. The second one of the at least two devices having an IEEE 1588 precision time protocol interface, the interface including one or more components configured for communications in both a wired manner and a wireless manner with the first one of the at least two devices. Wherein one of the at least two devices includes a master clock and the other one of the at least two devices includes a slave clock, wherein the master clock communicates a time to the slave clock and the slave clock is responsive to the communicated time from the master clock to adjust a time of the slave clock if necessary to substantially correspond to the time of the master clock, thereby time synchronizing the at least two devices together.

According to embodiments of a second aspect of the present invention, a method for communicating between at least two devices includes the steps of: providing a first one of the at least two devices with an IEEE 1588 precision time protocol interface configured for communications in both a wired manner and a wireless manner with a second one of the at least two devices; providing the second one of the at least two devices with an IEEE 1588 precision time protocol interface configured for communications in both a wired manner and a wireless manner with the first one of the at least two devices; and wherein one of the at least two devices includes a master clock and the other one of the at least two devices includes a slave clock, the master clock communicating a time to the slave clock and the slave clock is responsive to the communicated time from the master clock for adjusting a time of the slave clock if necessary to substantially correspond to the time of the master clock, thereby time synchronizing the at least two devices together.

According to embodiments of a third aspect of the present invention, a computer program product for implementing communications between at least two devices includes a storage medium having computer readable program code embodied thereon, which when executed by a computer causes the computer to implement a method, the method including the steps of: providing a first one of the at least two devices with an IEEE 1588 precision time protocol interface configured for communications in both a wired manner and a wireless manner with a second one of the at least two devices; providing the second one of the at least two devices with an IEEE 1588 precision time protocol interface configured for communications in both a wired manner and a wireless manner with the first one of the at least two devices; and wherein one of the at least two devices includes a master clock and the other one of the at least two devices includes a slave clock, the master clock communicating a time to the slave clock and the slave clock is responsive to the communicated time from the master clock for adjusting a time of the slave clock if necessary to substantially correspond to the time of the master clock, thereby time synchronizing the at least two devices together.

The above discussed and other features and advantages of the present invention will be appreciated and understood by those skilled in the art from the following detailed description and drawings.

DETAILED DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

FIG. 2, including FIGS. 2A-2D taken together, is a block diagram of electronics utilized as part of the AACMM of FIG. 1 in accordance with an embodiment;

FIG. 3, including FIGS. 3A and 3B taken together, is a block diagram describing detailed features of the electronic data processing system of FIG. 2 in accordance with an embodiment;

FIG. 4 is a perspective view of the portable AACMM of FIG. 1 used in conjunction with a laser tracker in embodiments of the present invention;

Figure 5:
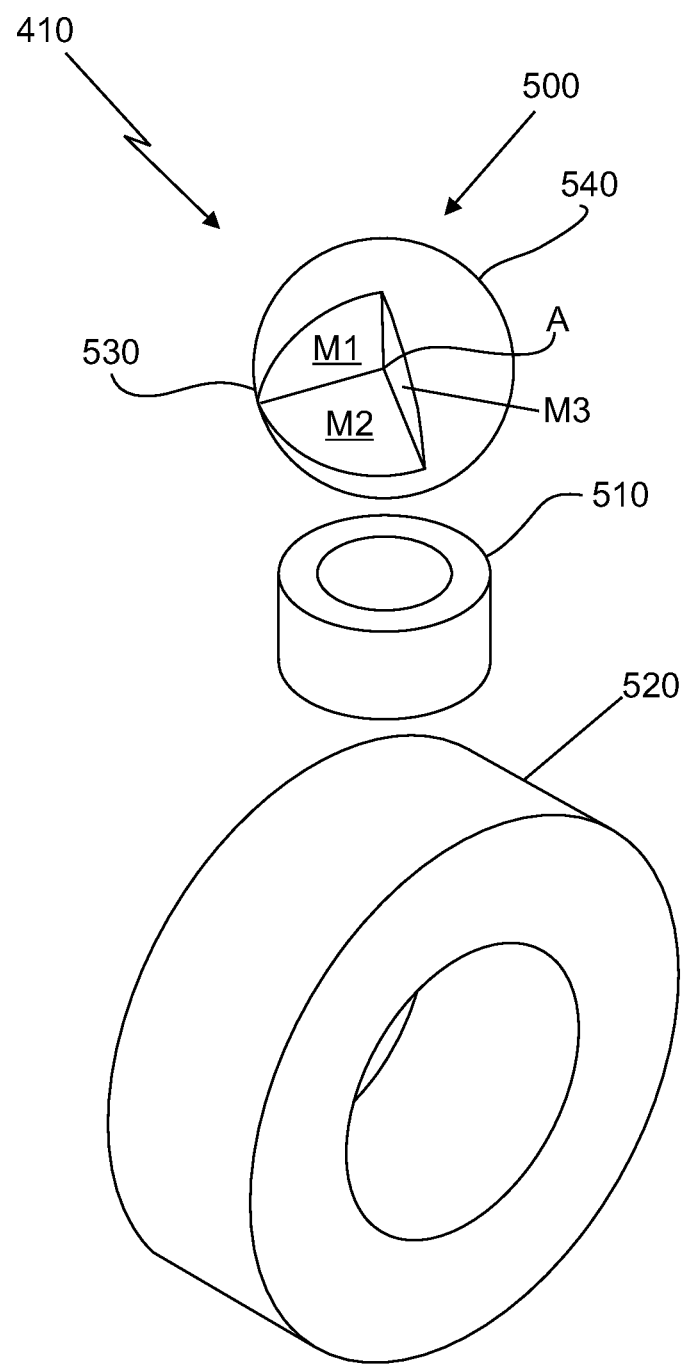
FIG. 5 is an exploded, perspective view of a retroreflector clamp assembly used with the portable AACMM of FIG. 1 in the embodiments of the present invention of FIG. 4.
Figure 8:
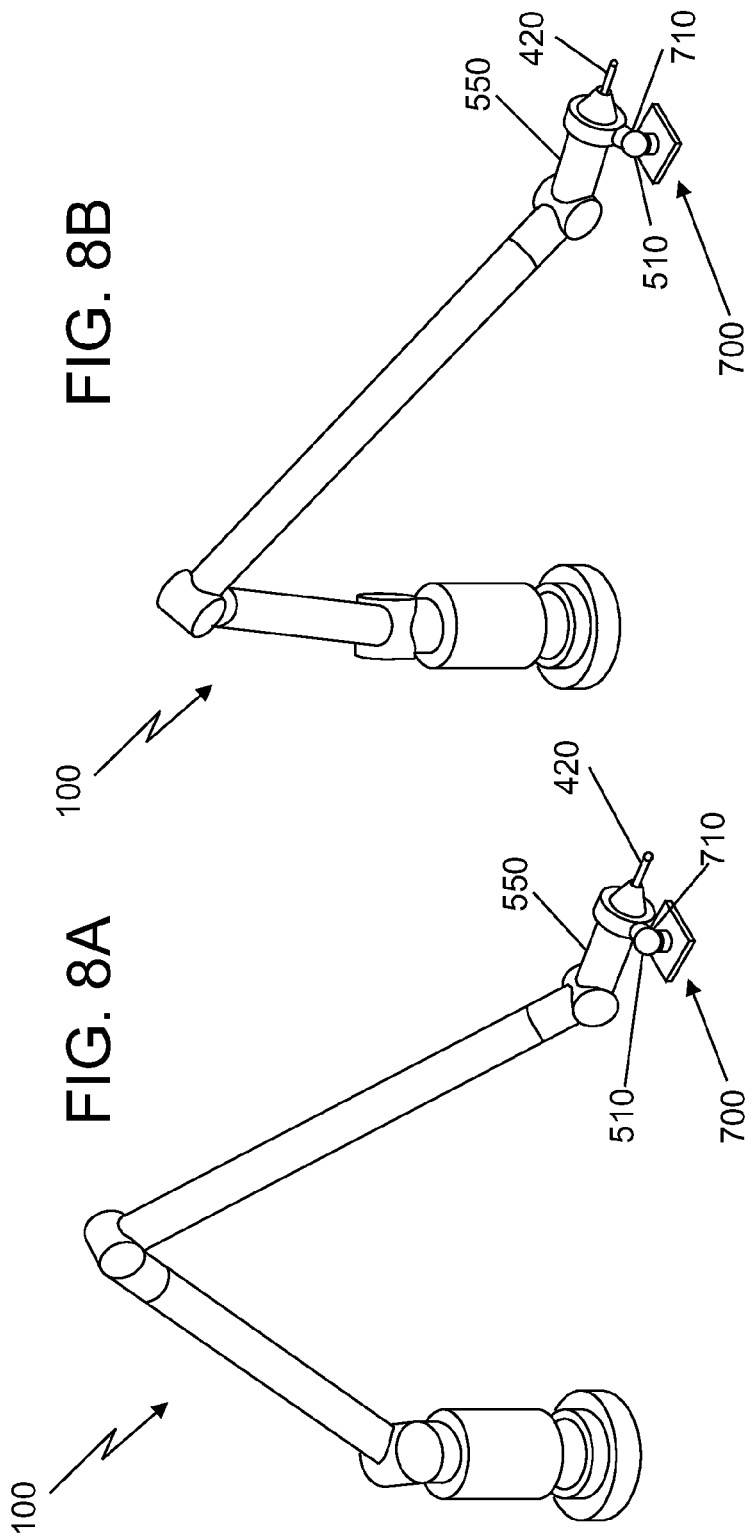
Figure 9:
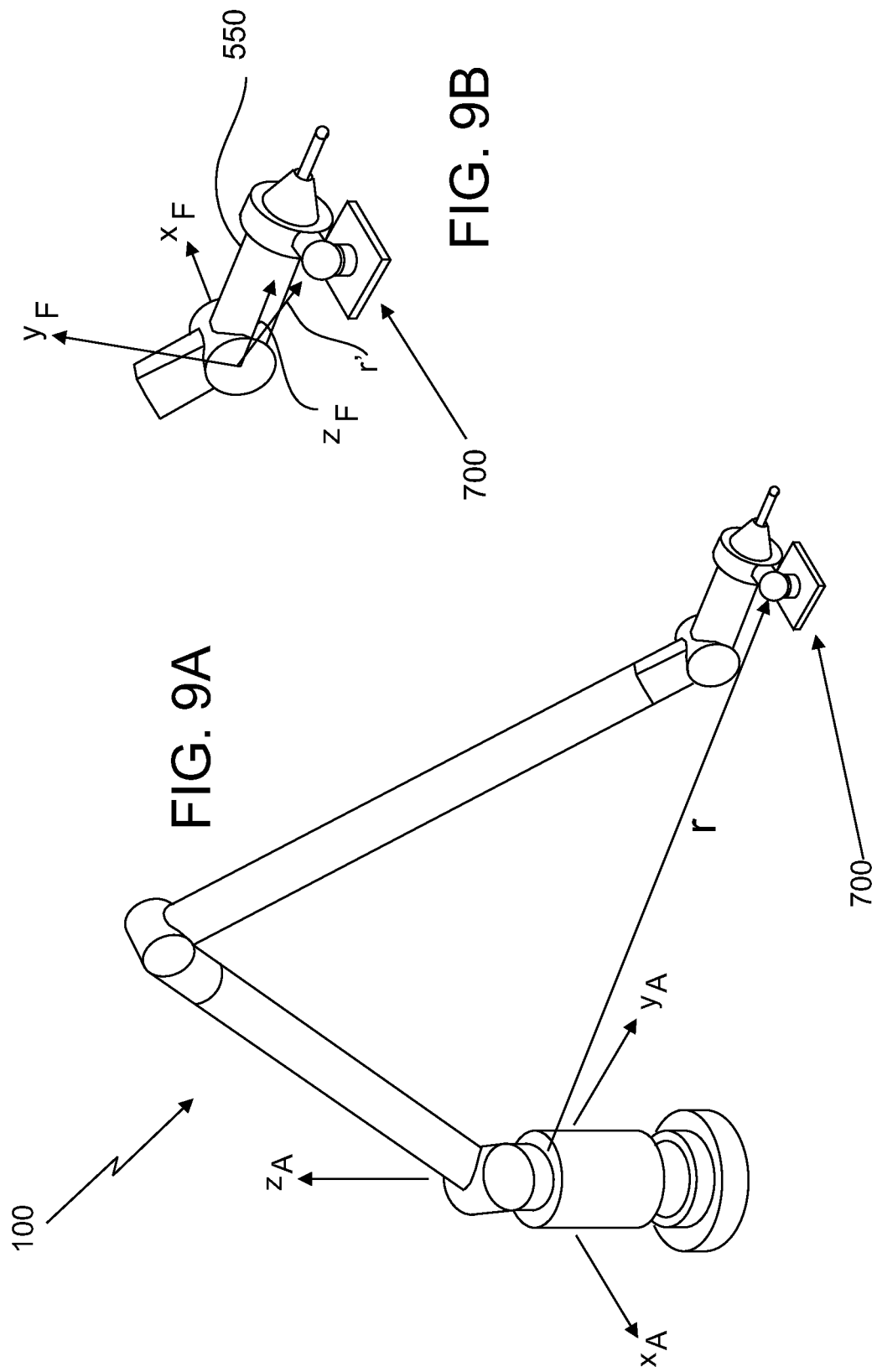
Figure 10:
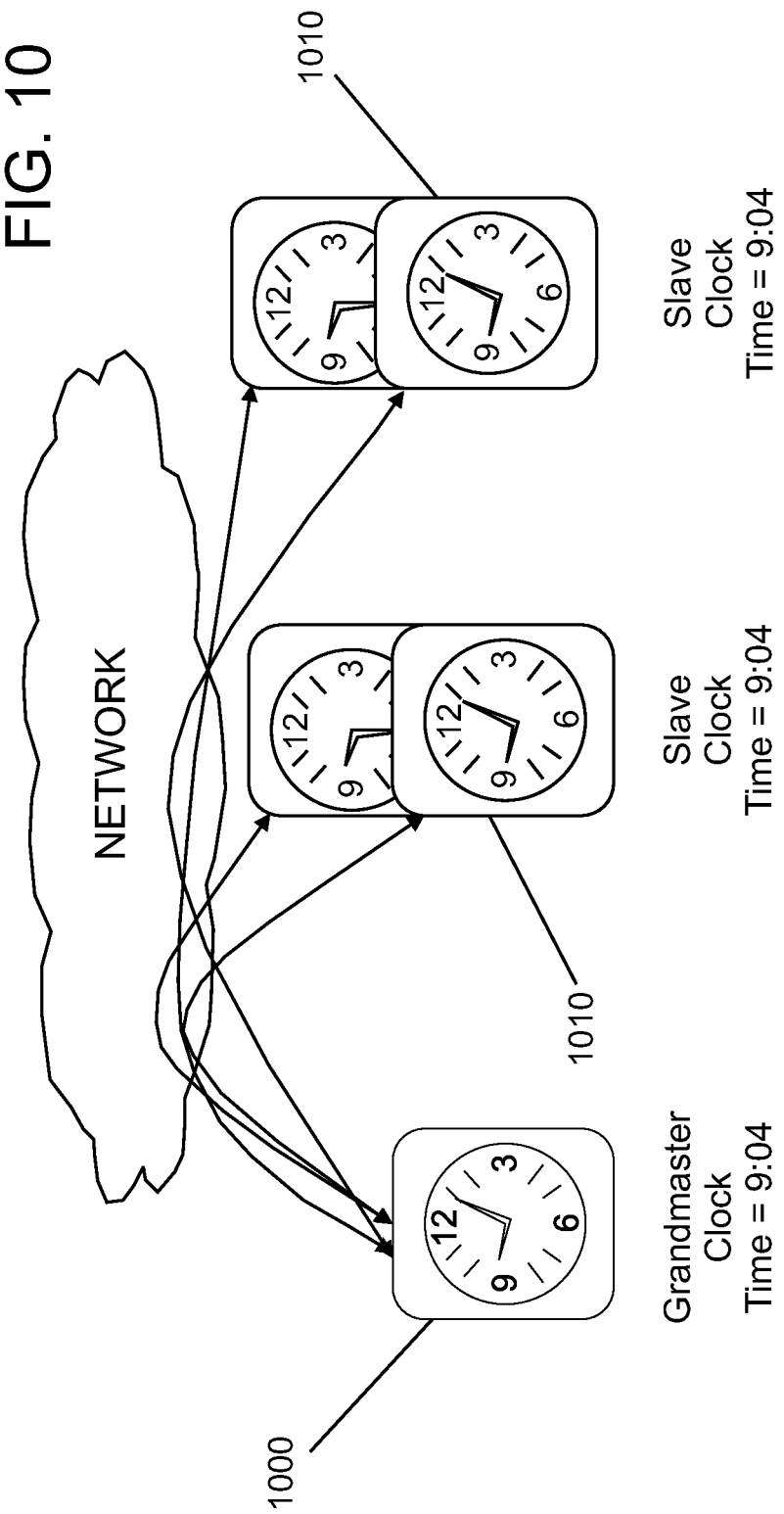
Figure 11:
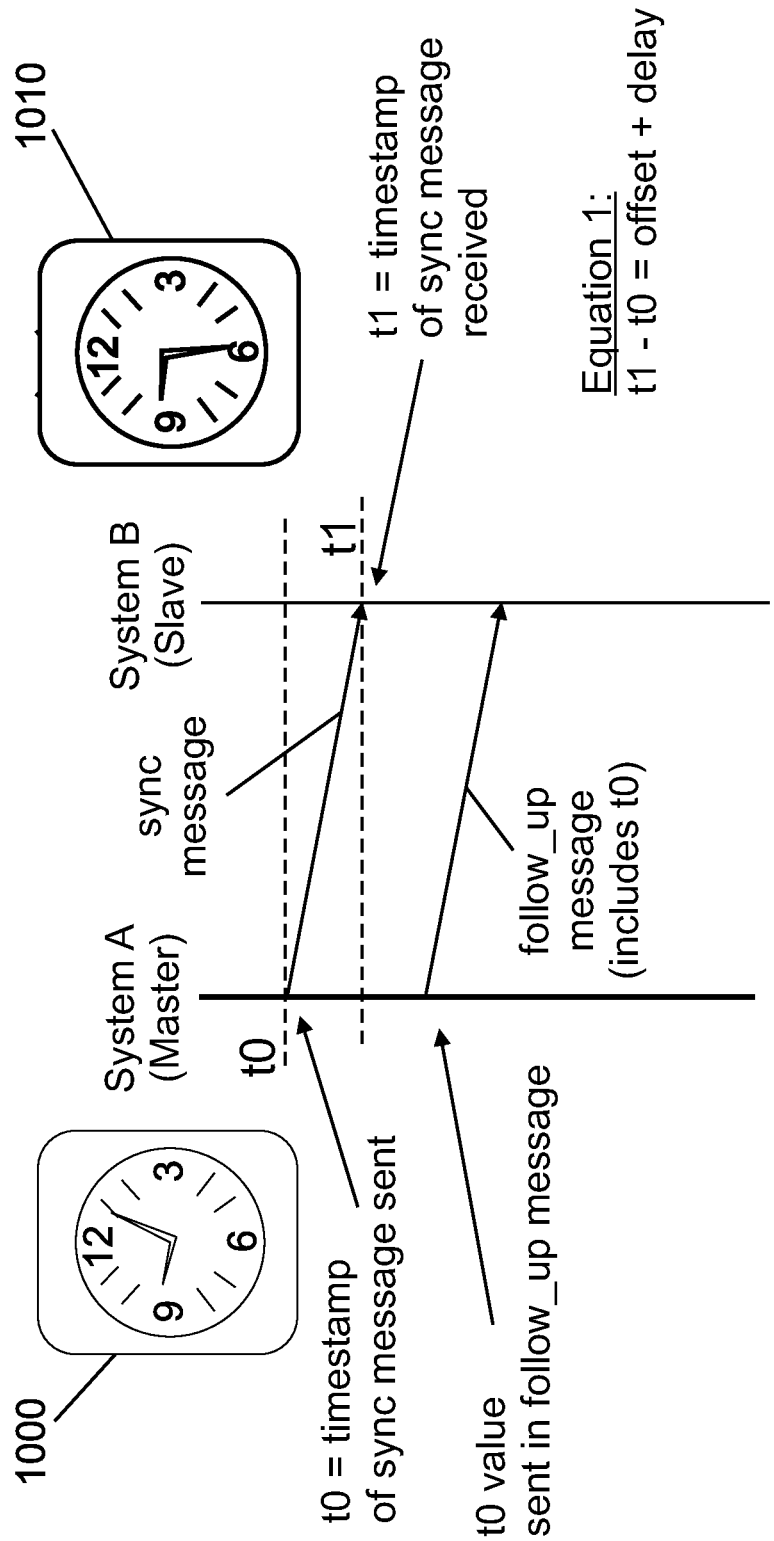
Figure 12:
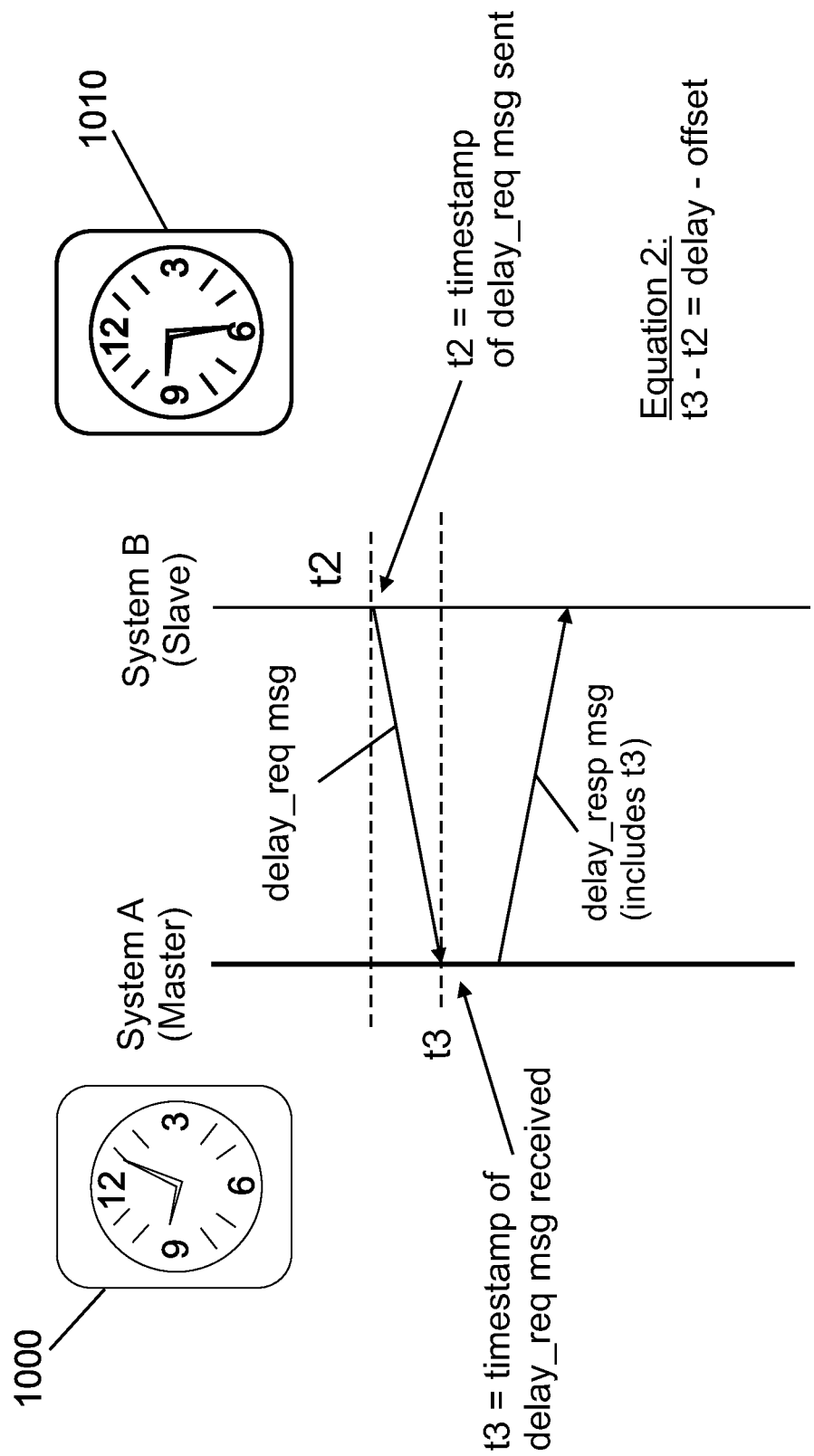
Figure 13:
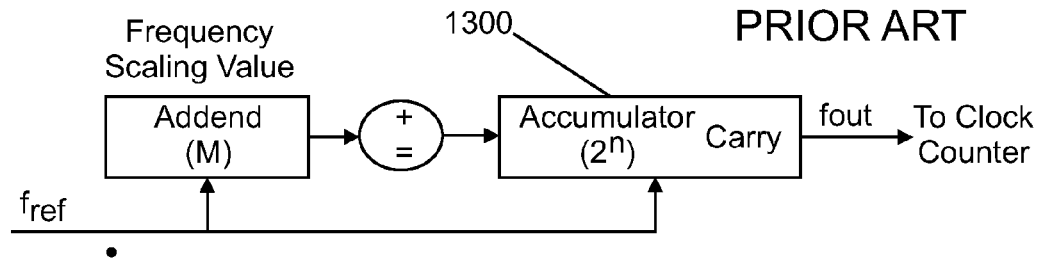
Figure 14:
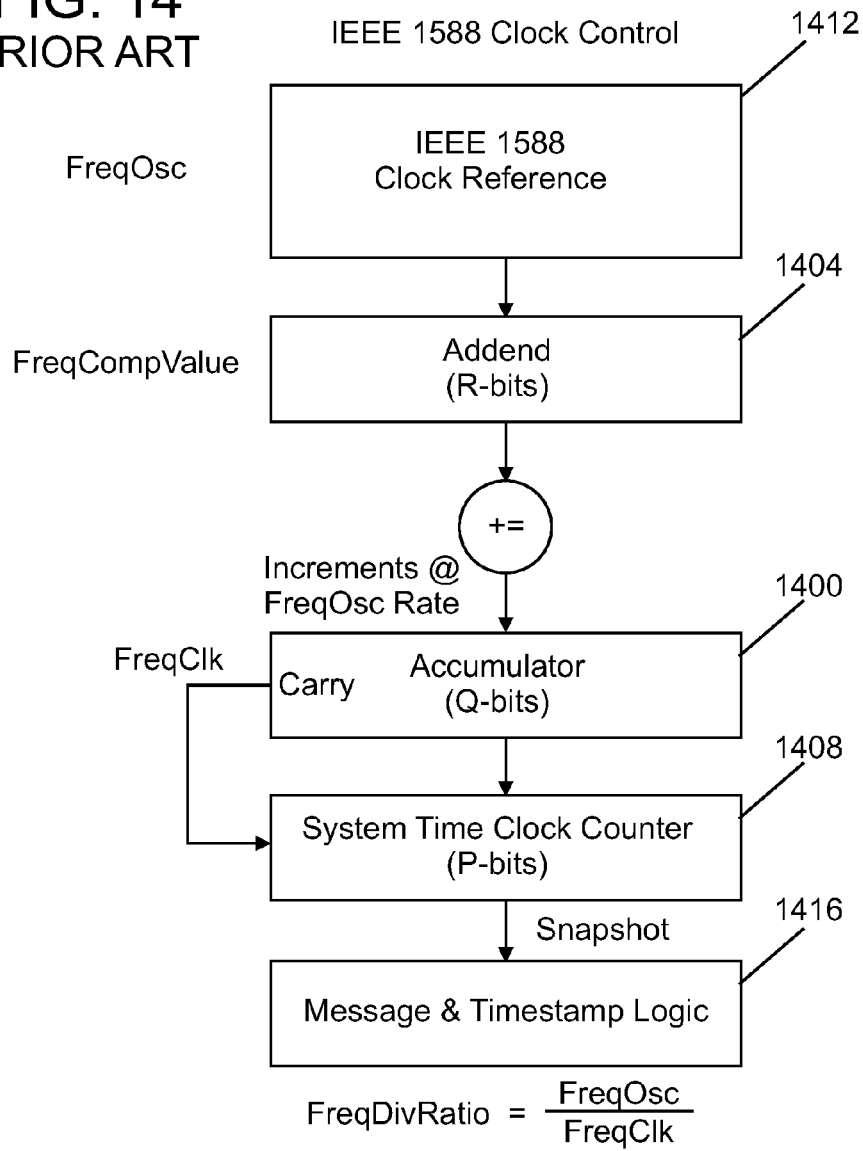
Figure 15:
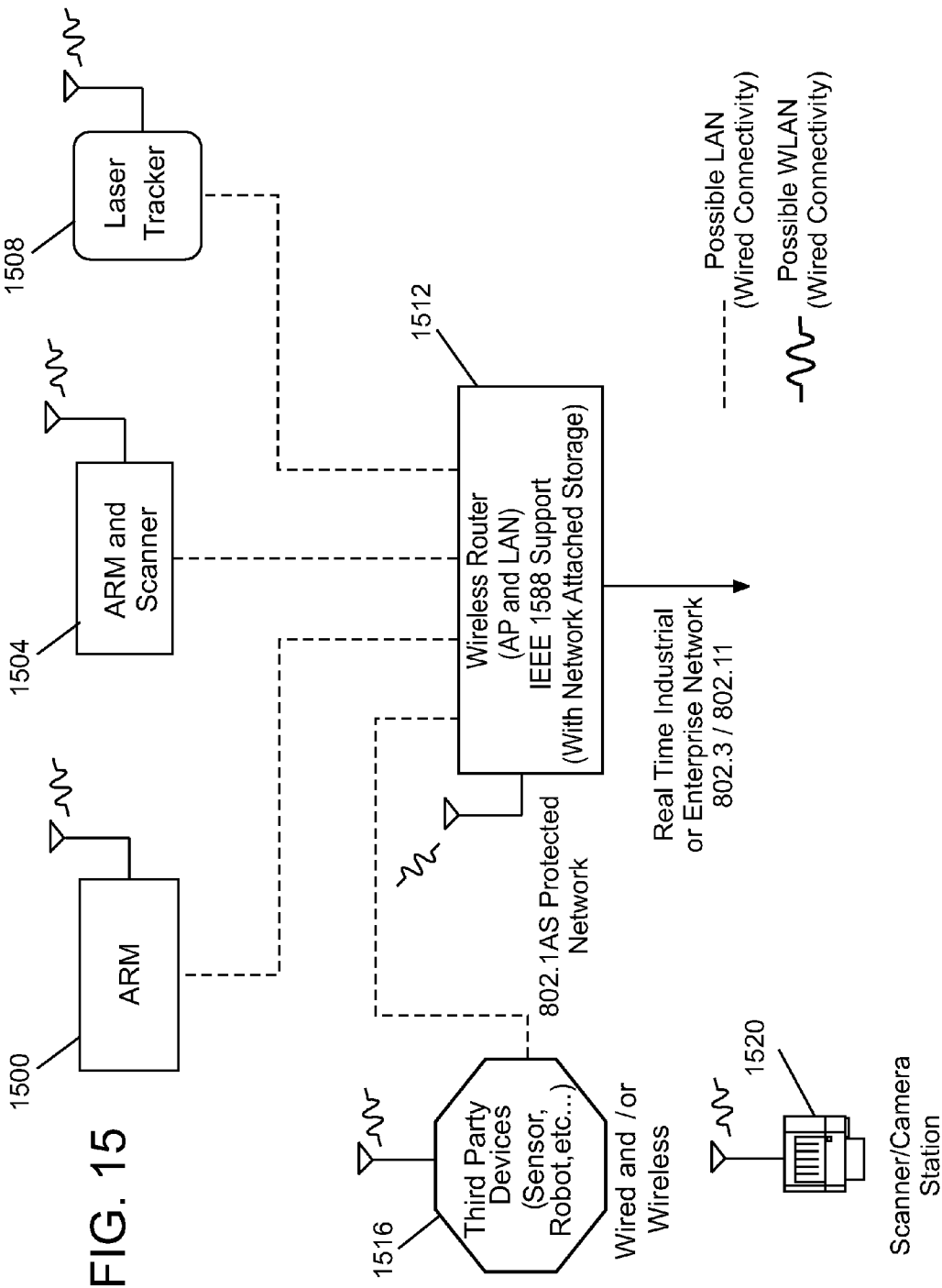
Figures 16, 16A:
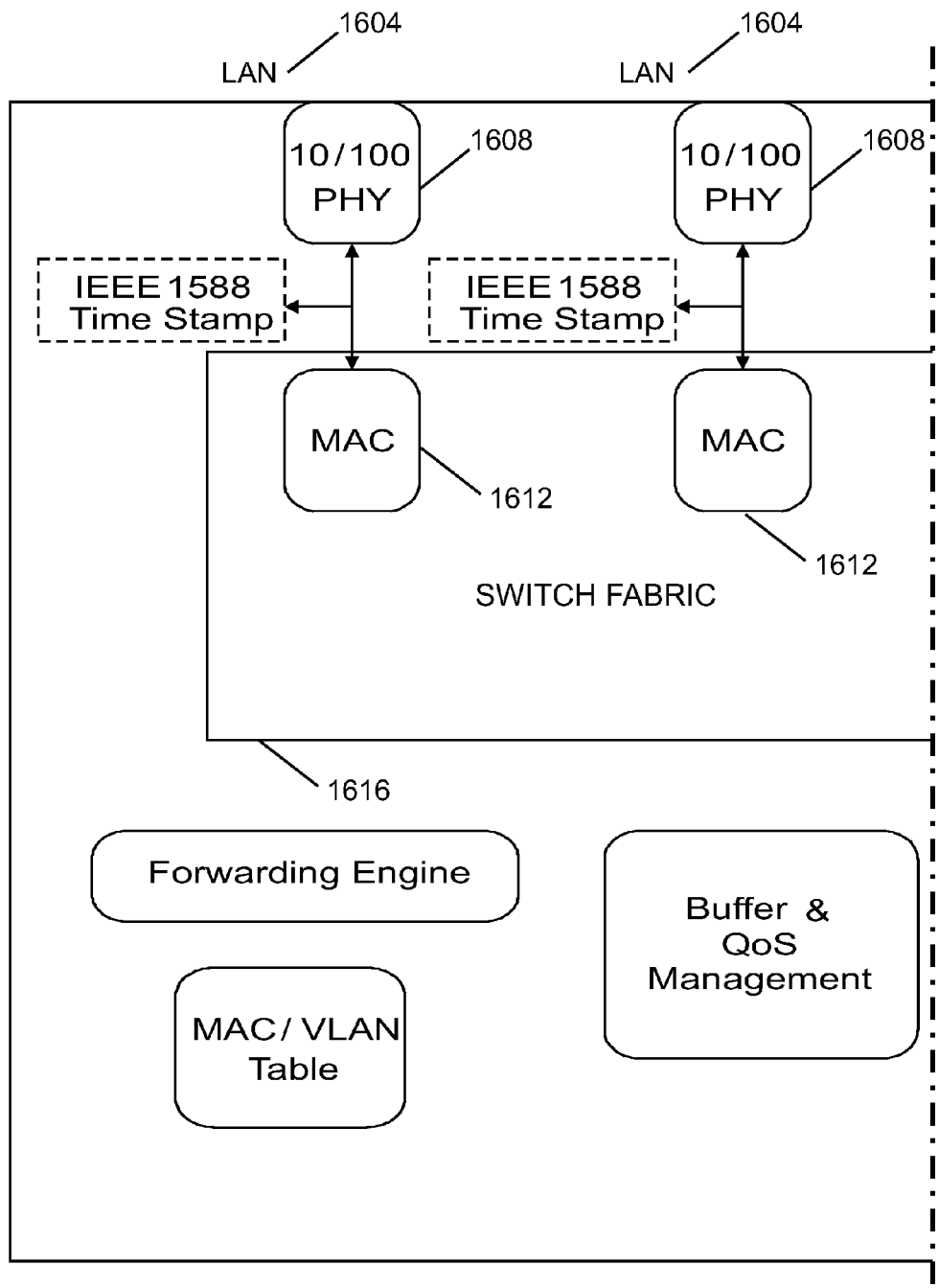
Figure 16B:
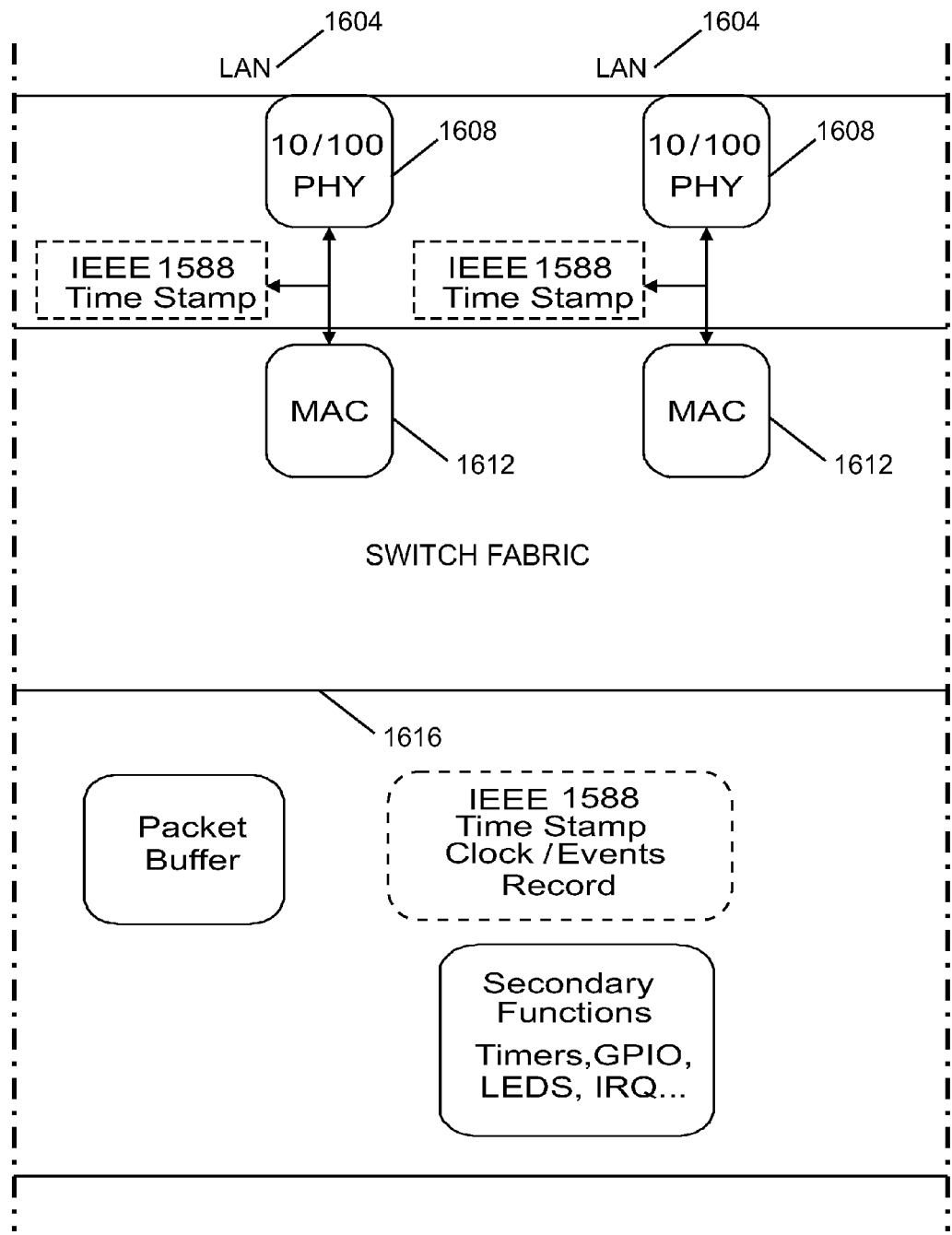
Figure 16C:
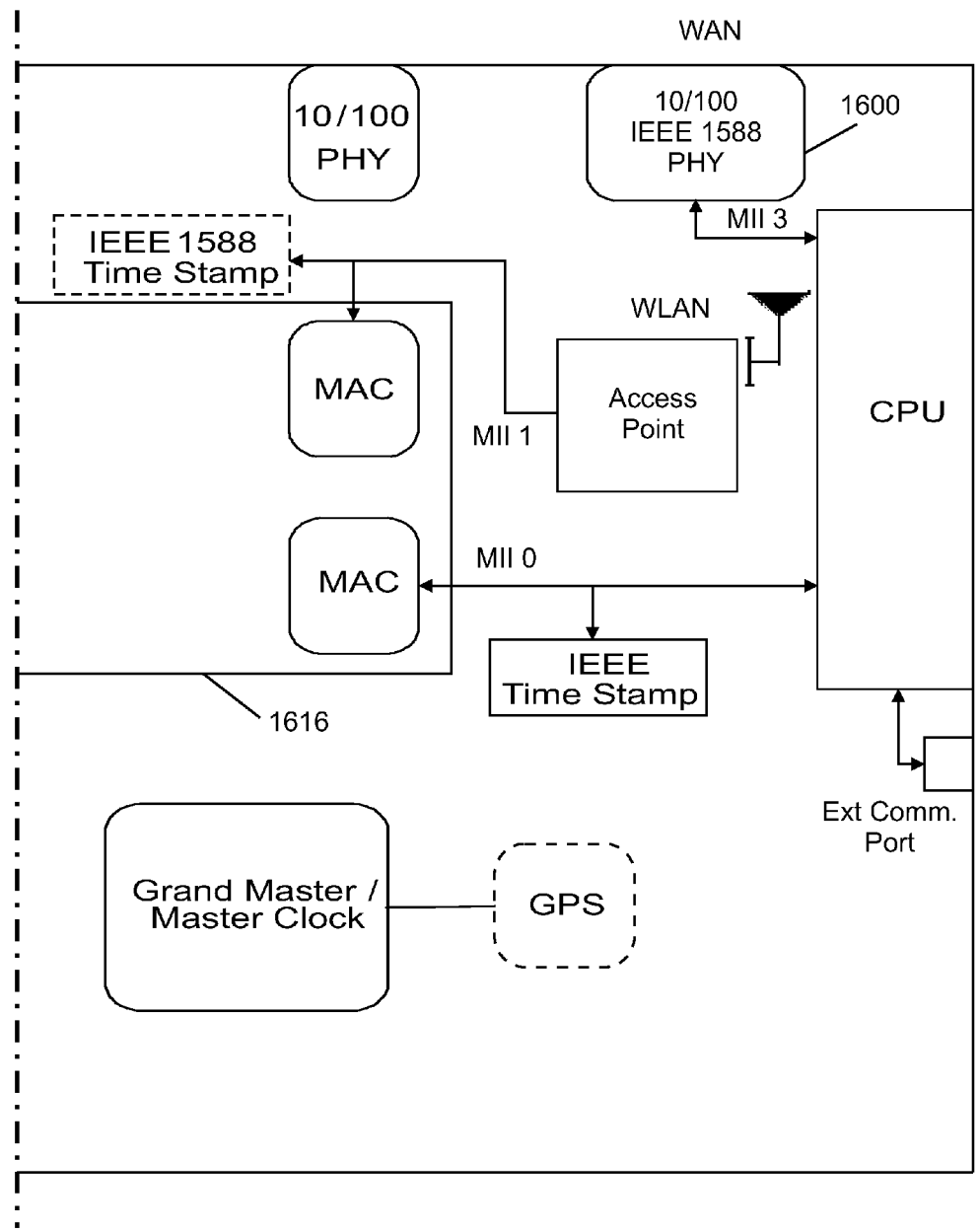
Figure 17:
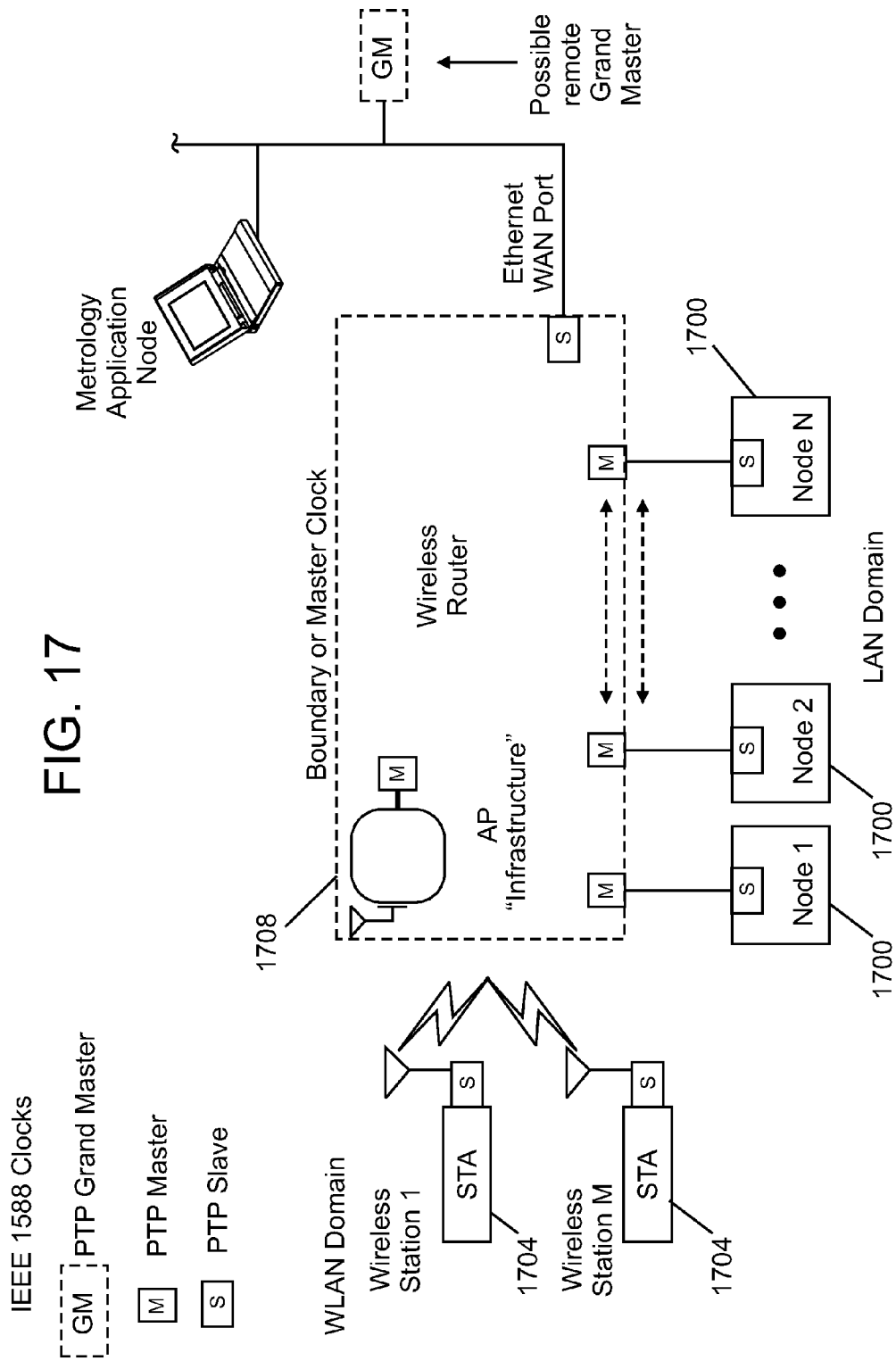
Figure 18:
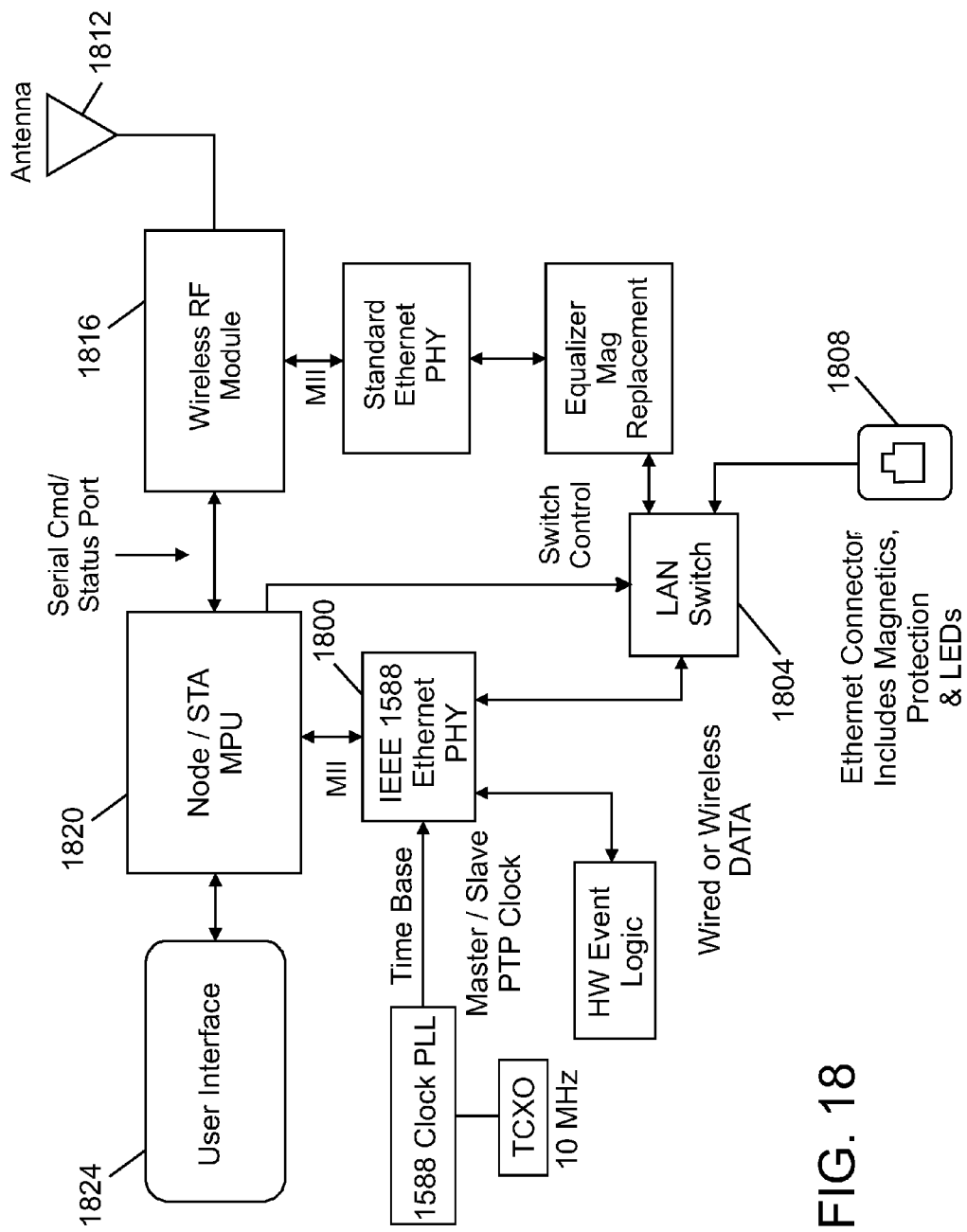
Figure 19:
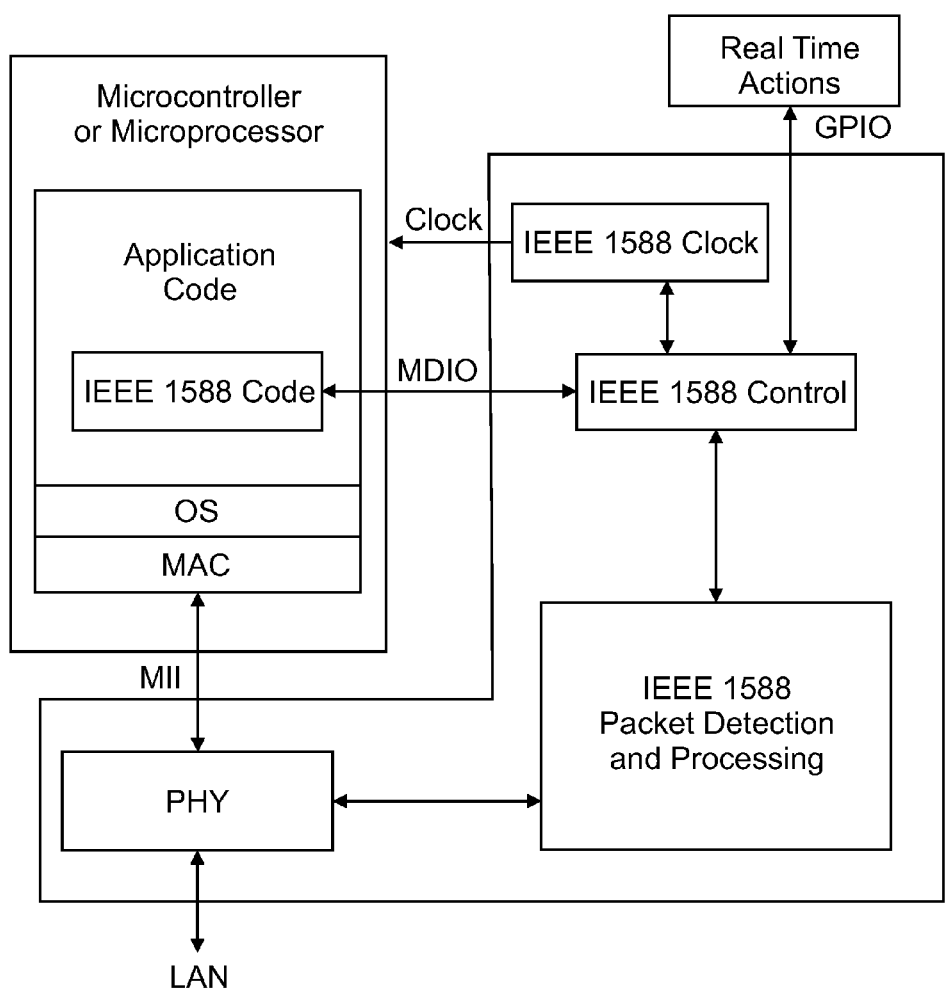
Figures 20, 20A:
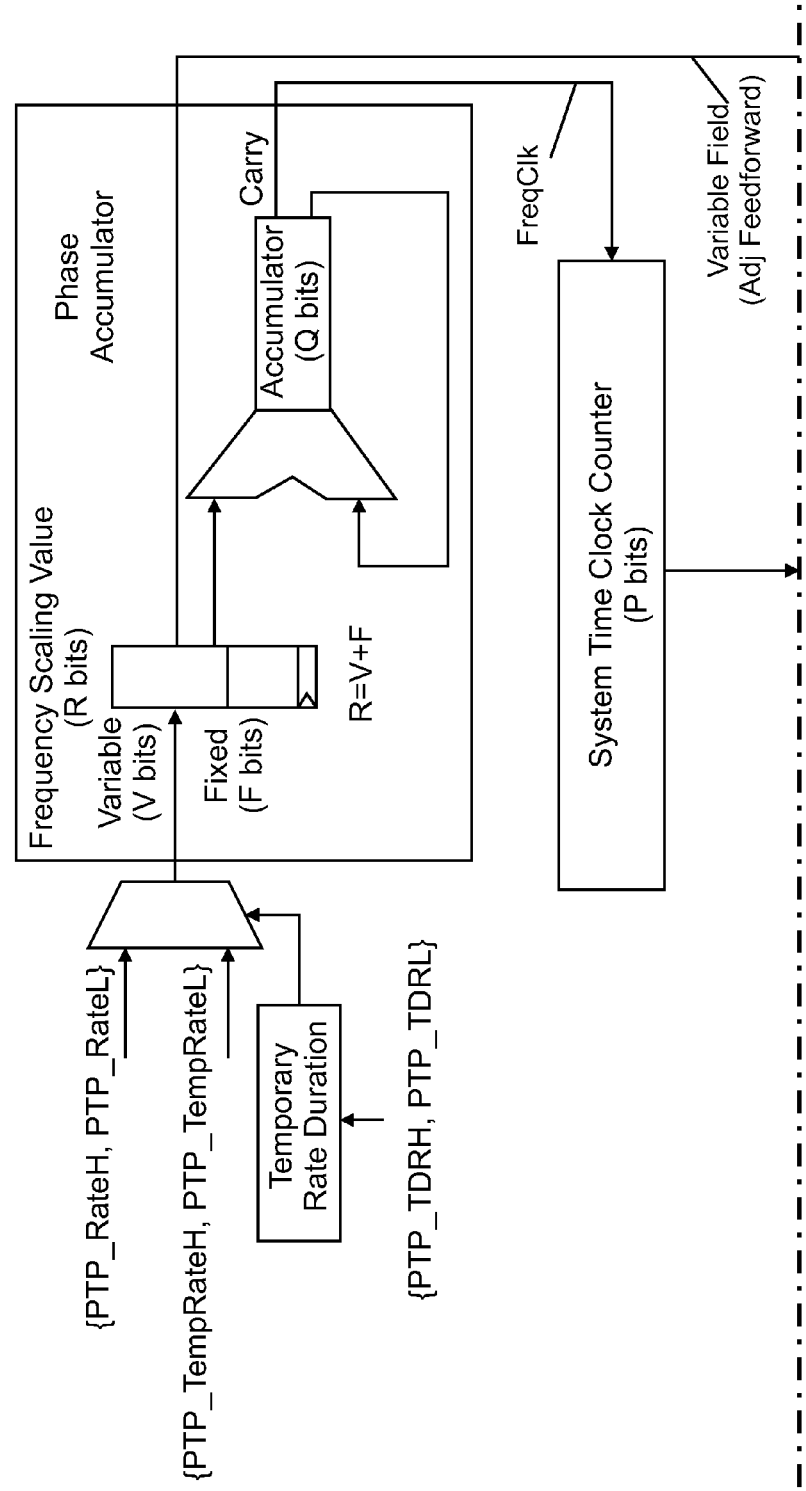
Figure 20B:
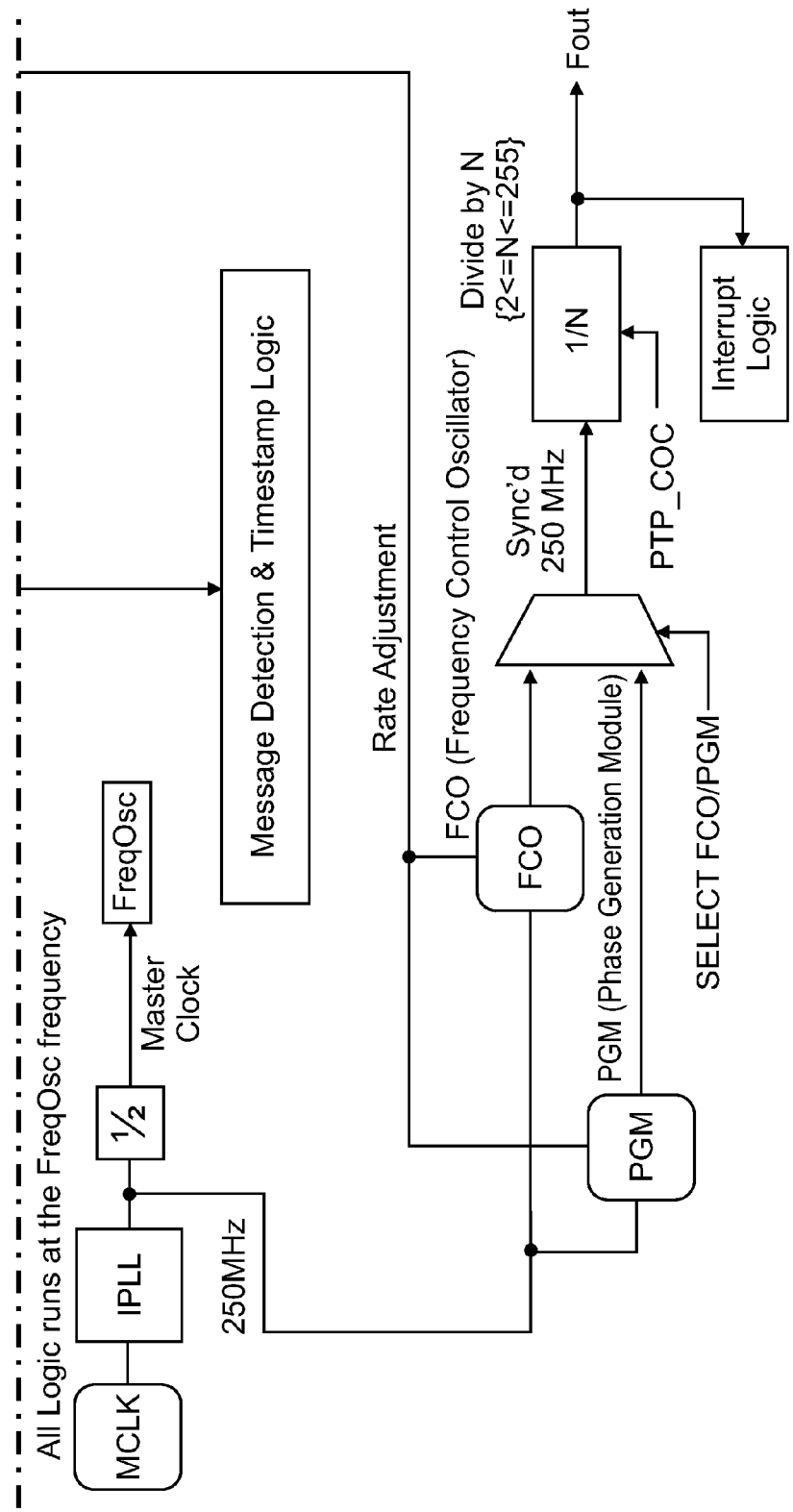
Figure 21:
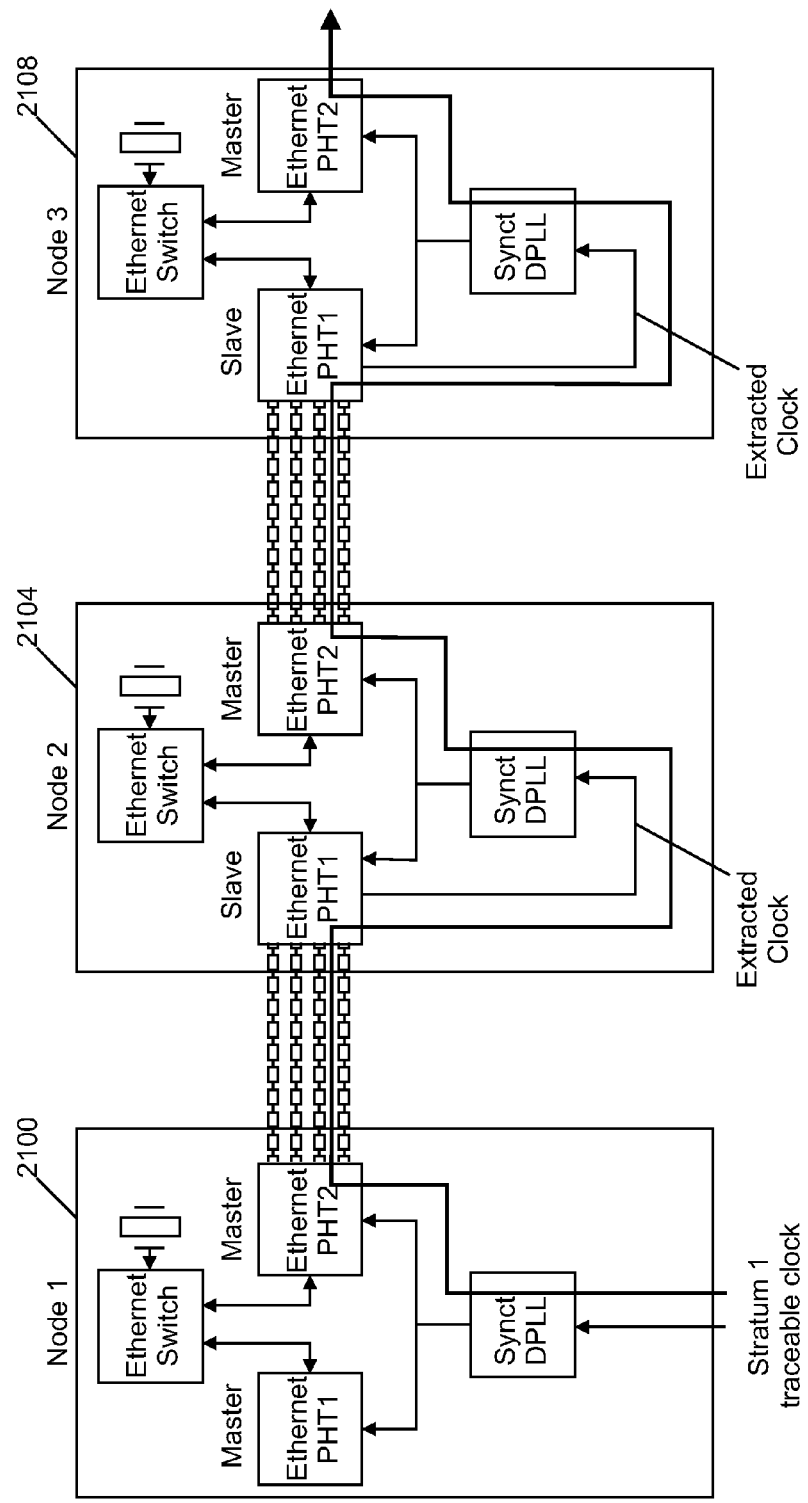
Figure 22:
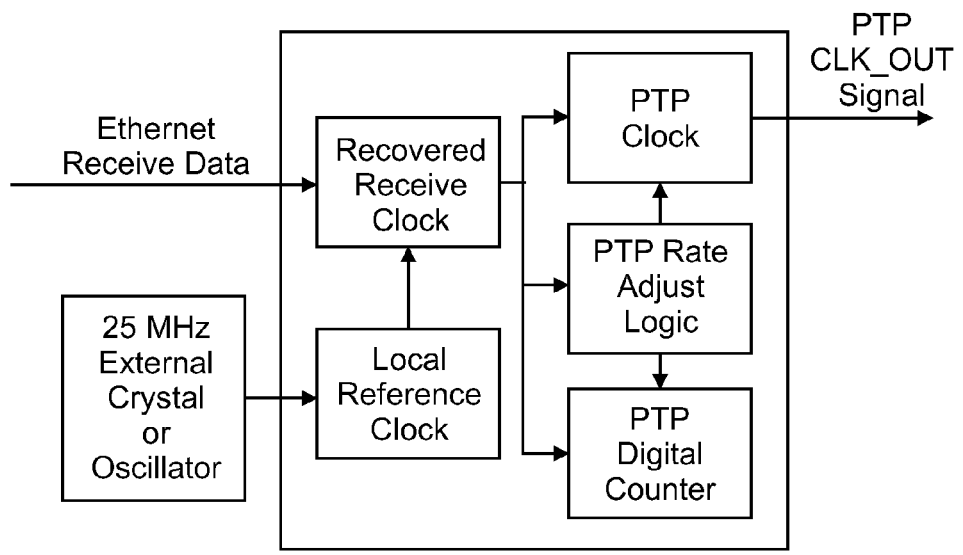
Figure 23:
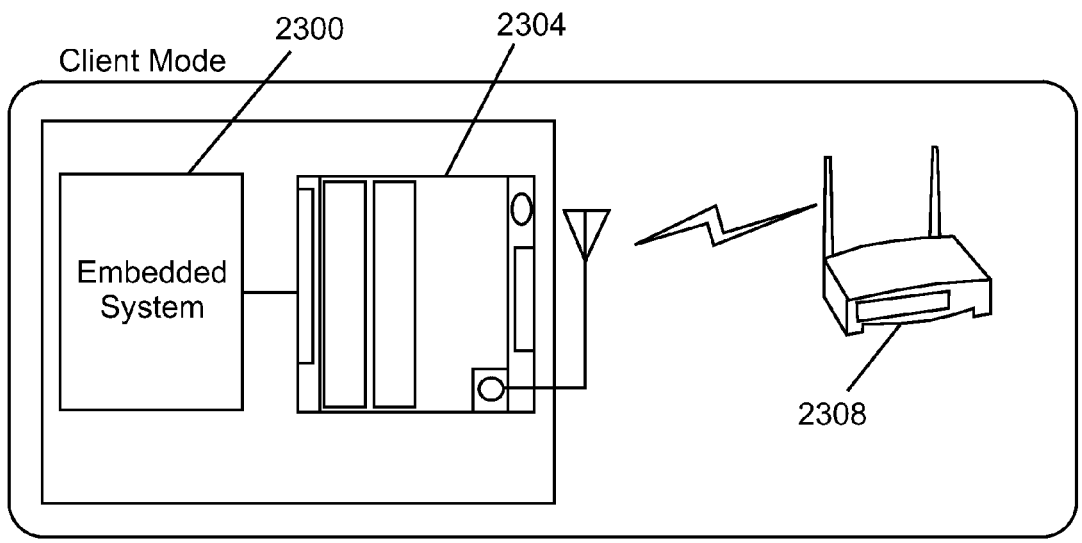

FIG. 8, including FIGS. 8A and 8B, are perspective views of the portable AACMM of FIG. 1 in contact with the mounted sphere assembly of FIG. 5 in embodiments of the present invention of FIG. 4;

FIG. 9, including FIGS. 9A and 9B, are perspective views similar to those of FIG. 8 of the portable AACMM of FIG. 1 in contact with the mounted sphere assembly of FIG. 5 in embodiments of the present invention of FIG. 4 with reference made to a coordinate frame of reference;

FIG. 10 is a diagram showing a grandmaster clock being time synchronized to one or more slave clocks using the IEEE 1588 precision time protocol;

FIGS. 11 and 12 are diagrams illustrating the IEEE 1588 offset and delay measurement as part of the time synchronization procedure between the grandmaster clock and the one or more slave clocks of FIG. 10;

FIG. 13 is a block diagram of a variable hardware clock used within a slave clock and having a phase accumulator as in the prior art;

FIG. 14 is a block diagram of IEEE 1588 PTP clock control using a phase accumulator as in the prior art;

FIG. 15 is a block diagram showing a plurality of metrology devices together with other devices connected by wired and wireless connections to a wireless router and on to a network;

FIG. 16, including FIGS. 16A-16C taken together, is a block diagram illustrating a simplified view of a wireless router having IEEE 1588 PTP master, boundary or optional transparent clock support;

FIG. 17 is a block diagram illustrating the hierarchy of clocks utilized by the IEEE 1588 PTP in an exemplary embodiment of the present invention with various wired nodes in a LAN domain and various wireless stations in a WLAN domain connected by wired and wireless connections to a central router;

FIG. 18 is a block diagram illustrating the functions performed within a slave device implementing the IEEE 1588 PTP;

FIG. 19 is a more detailed block diagram of a hardware timestamp within an IEEE 1588 PTP PHY device;

FIG. 20, including FIGS. 20A and 20B taken together, is a functional diagram of timing control and external signal generation within an IEEE 1588 PTP PHY device;

FIG. 21 is a functional block diagram of a synchronous Ethernet configuration of a plurality of nodes;

FIG. 22 is a functional block diagram of the functions within an IEEE 1588 PTP PHY device for supporting the synchronous Ethernet configuration of FIG. 21; and FIG. 23 is a functional block diagram of a wireless station that includes a wireless LAN module used as a means of bridging a wireless network with a wired Ethernet network.

DETAILED DESCRIPTION

Figure 1A:
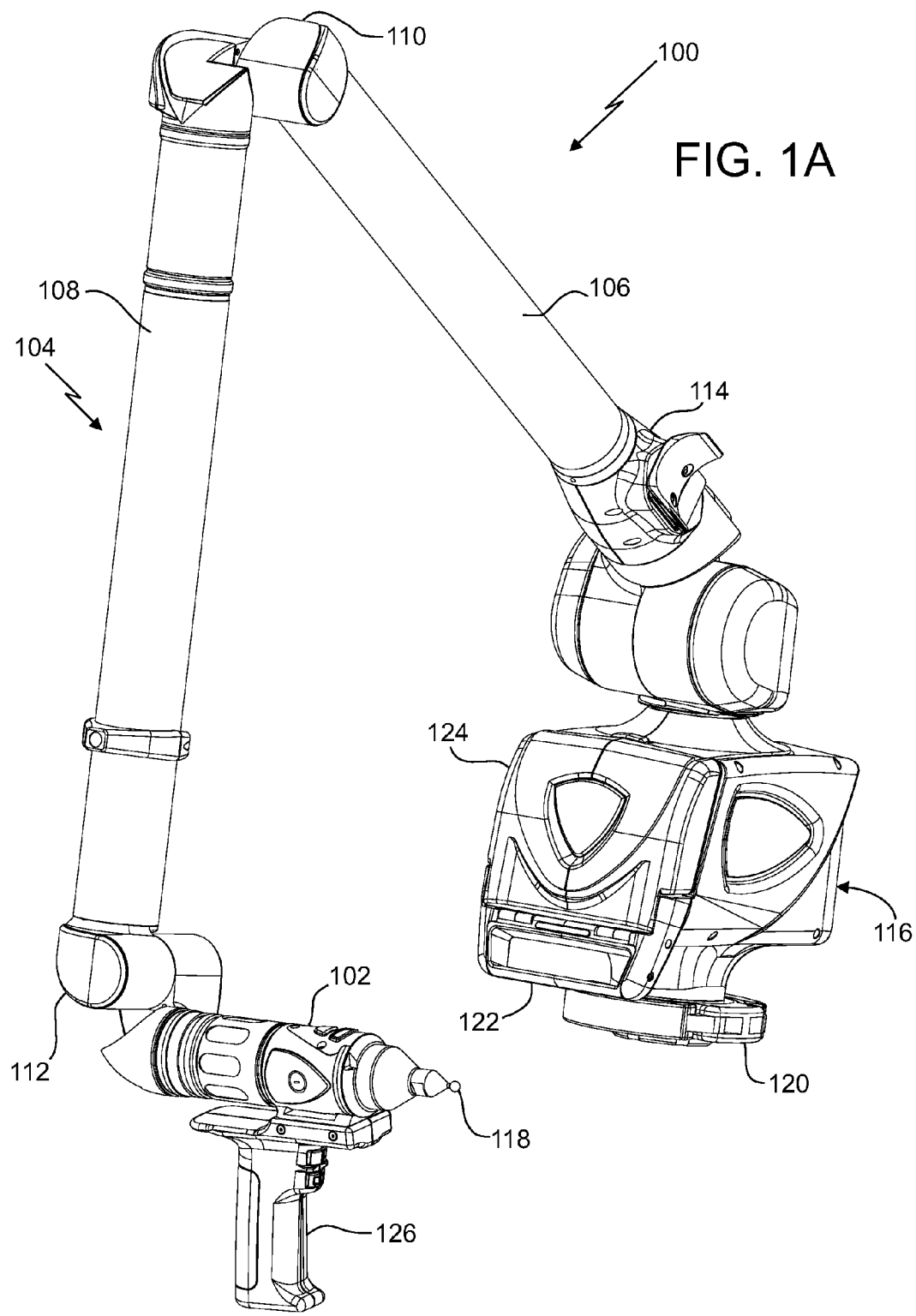
Figure 1B:
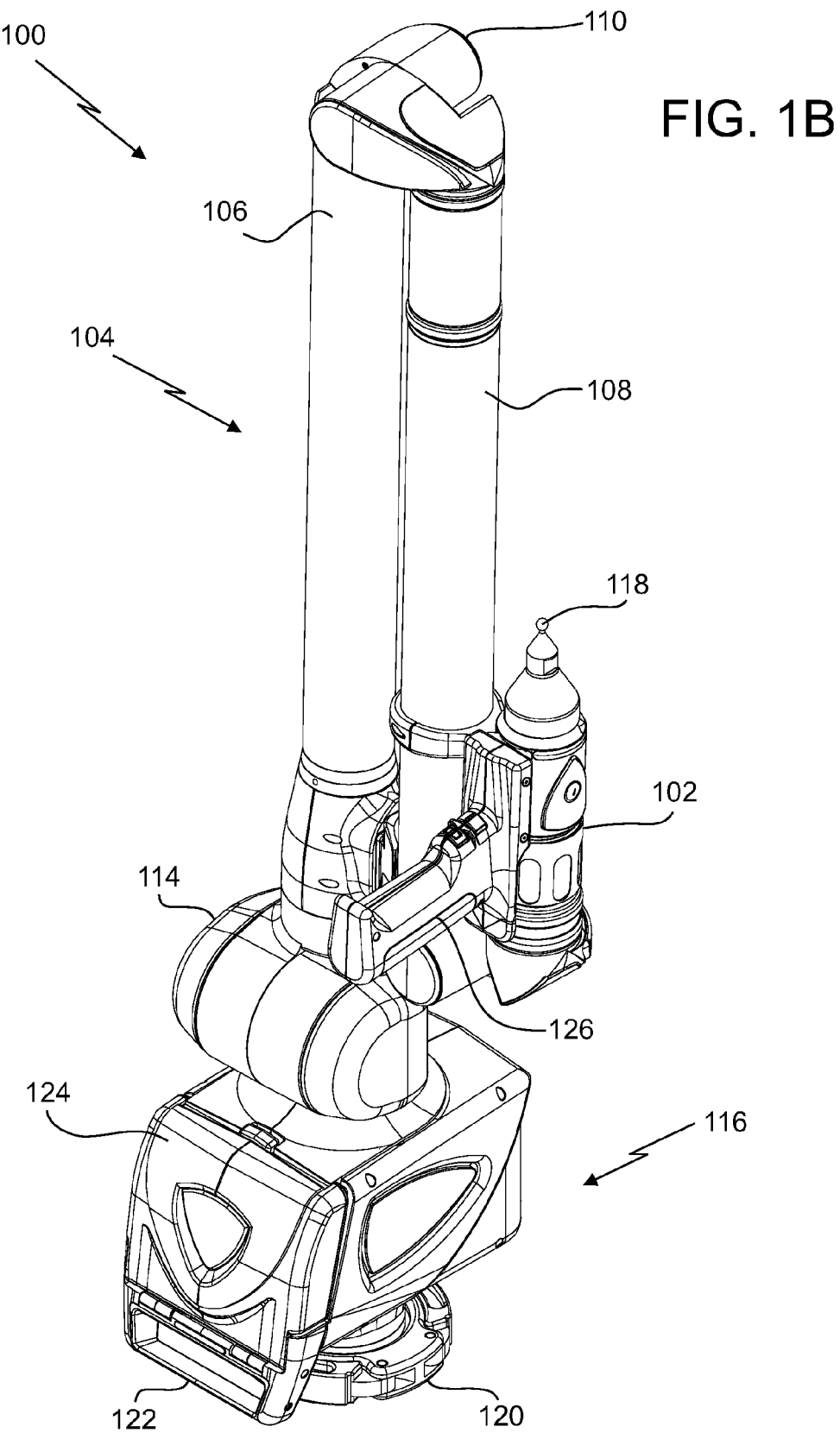

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
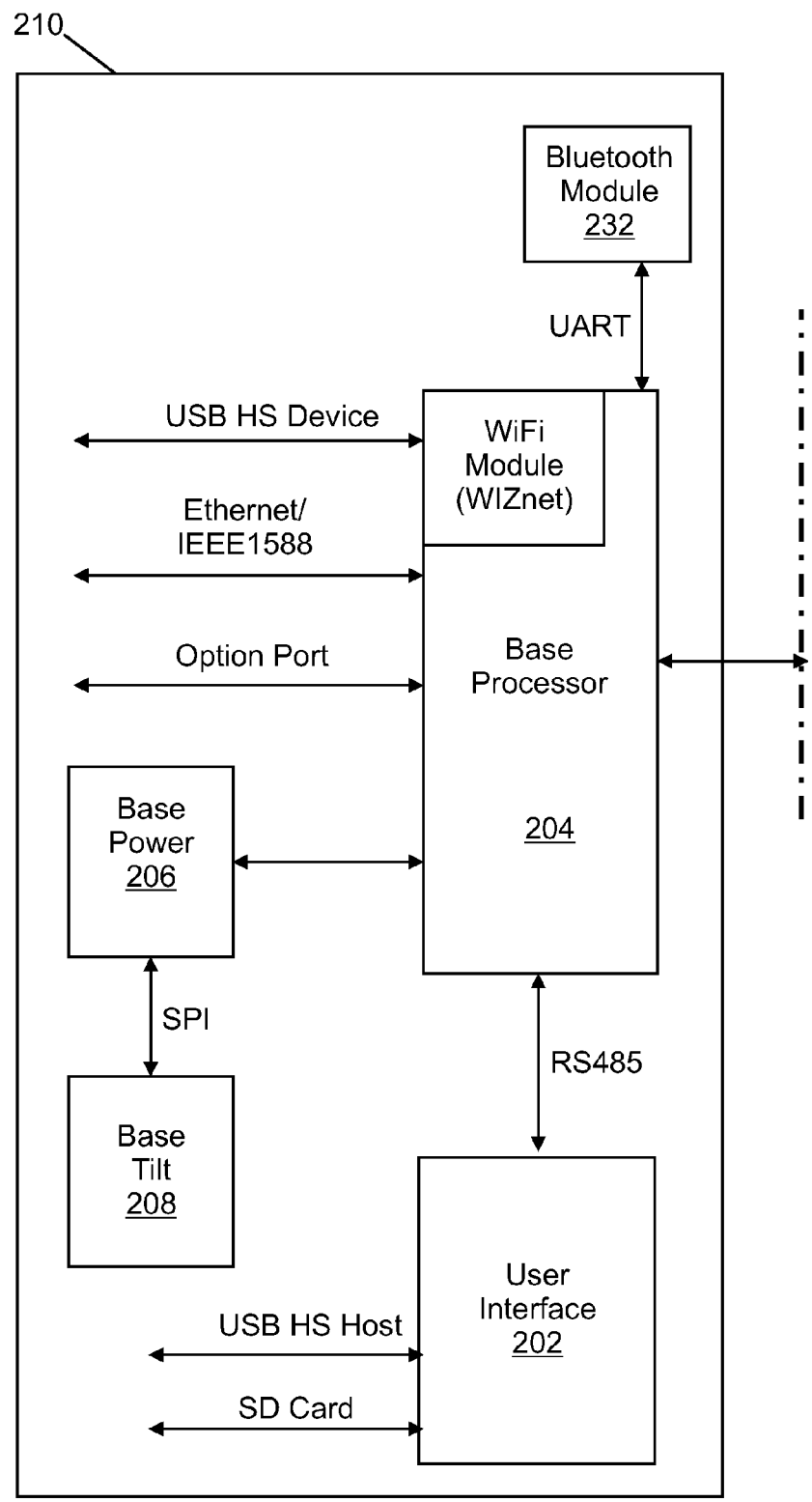
Figure 2B:
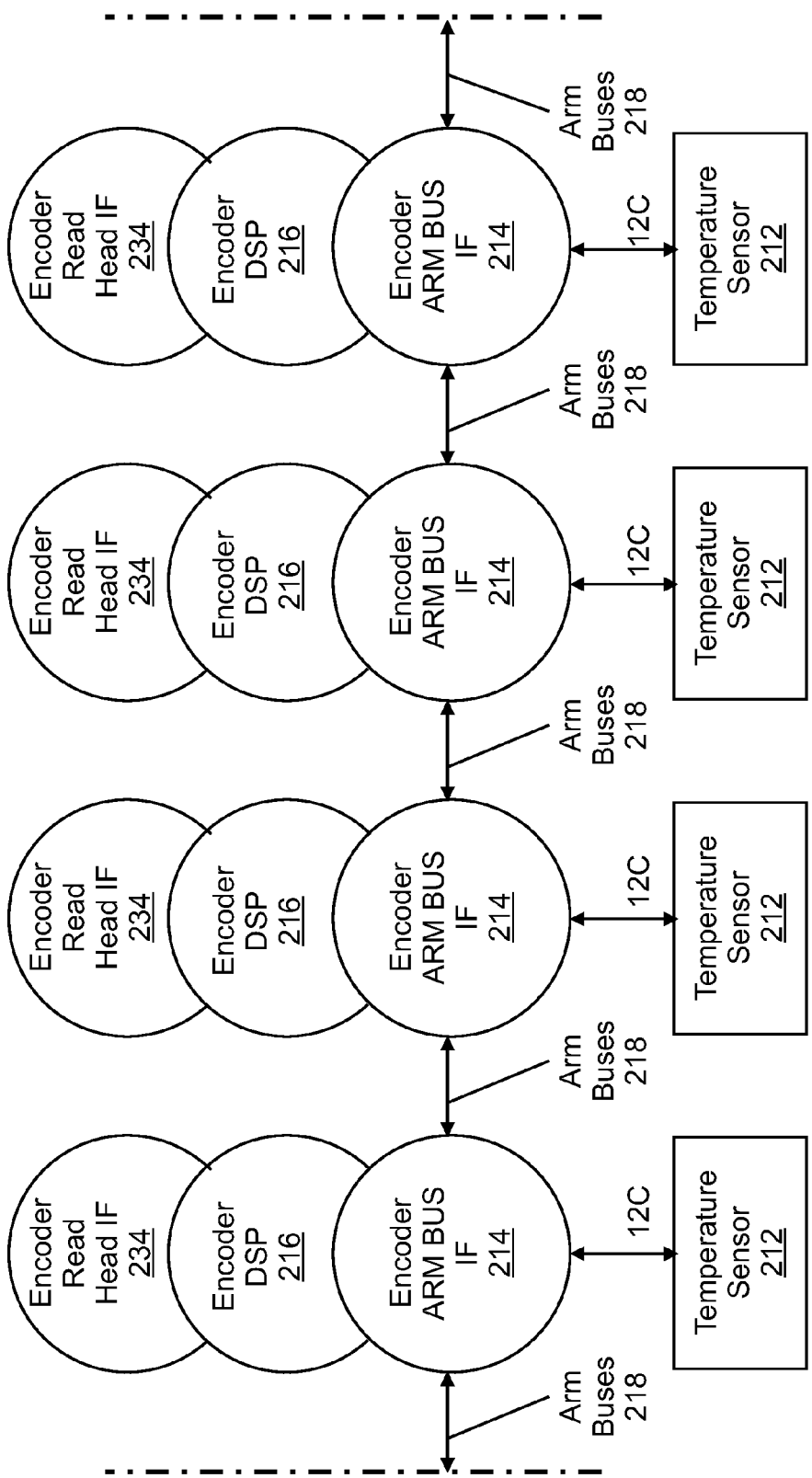
Figure 2C:
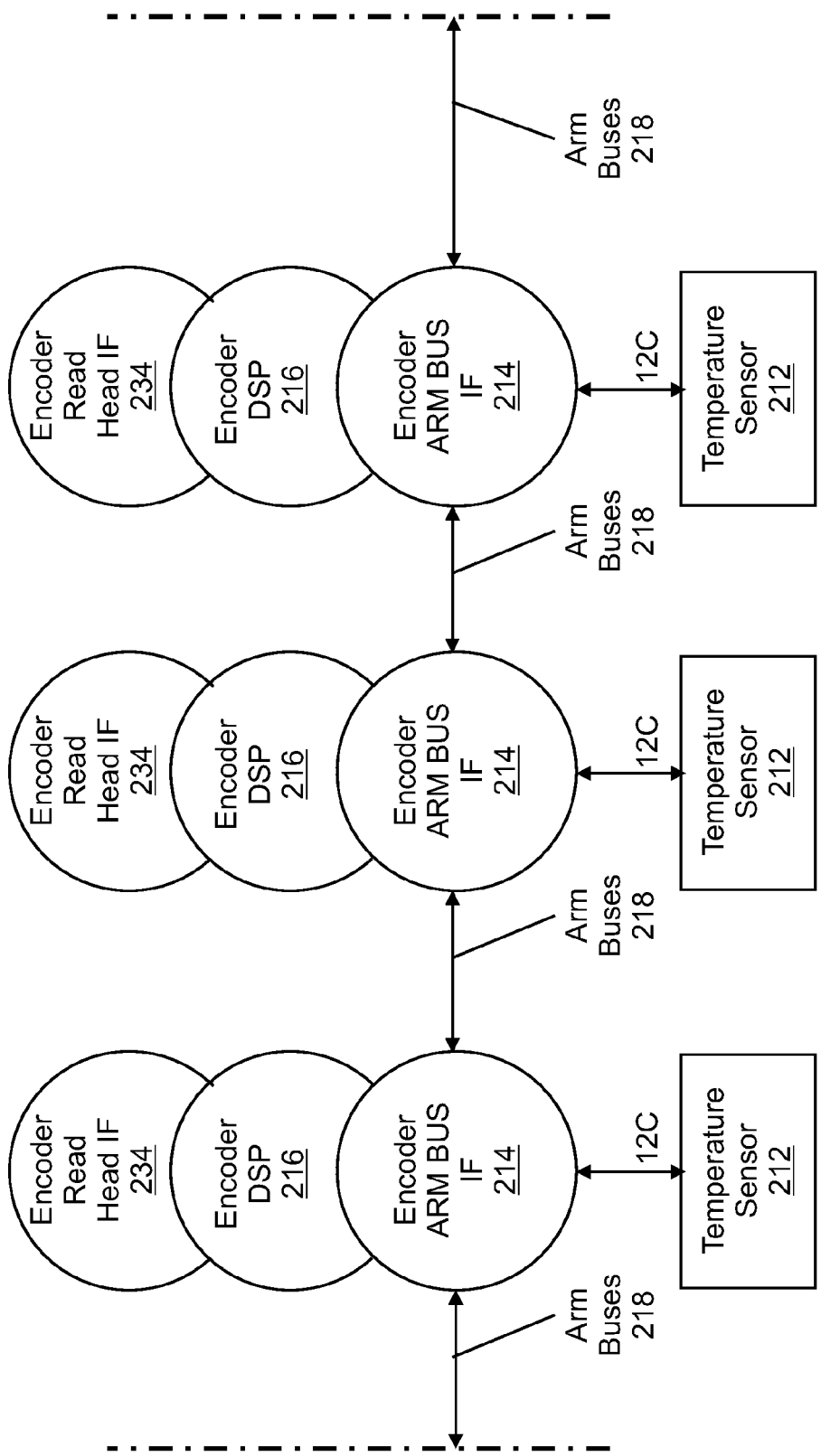
Figure 2D:
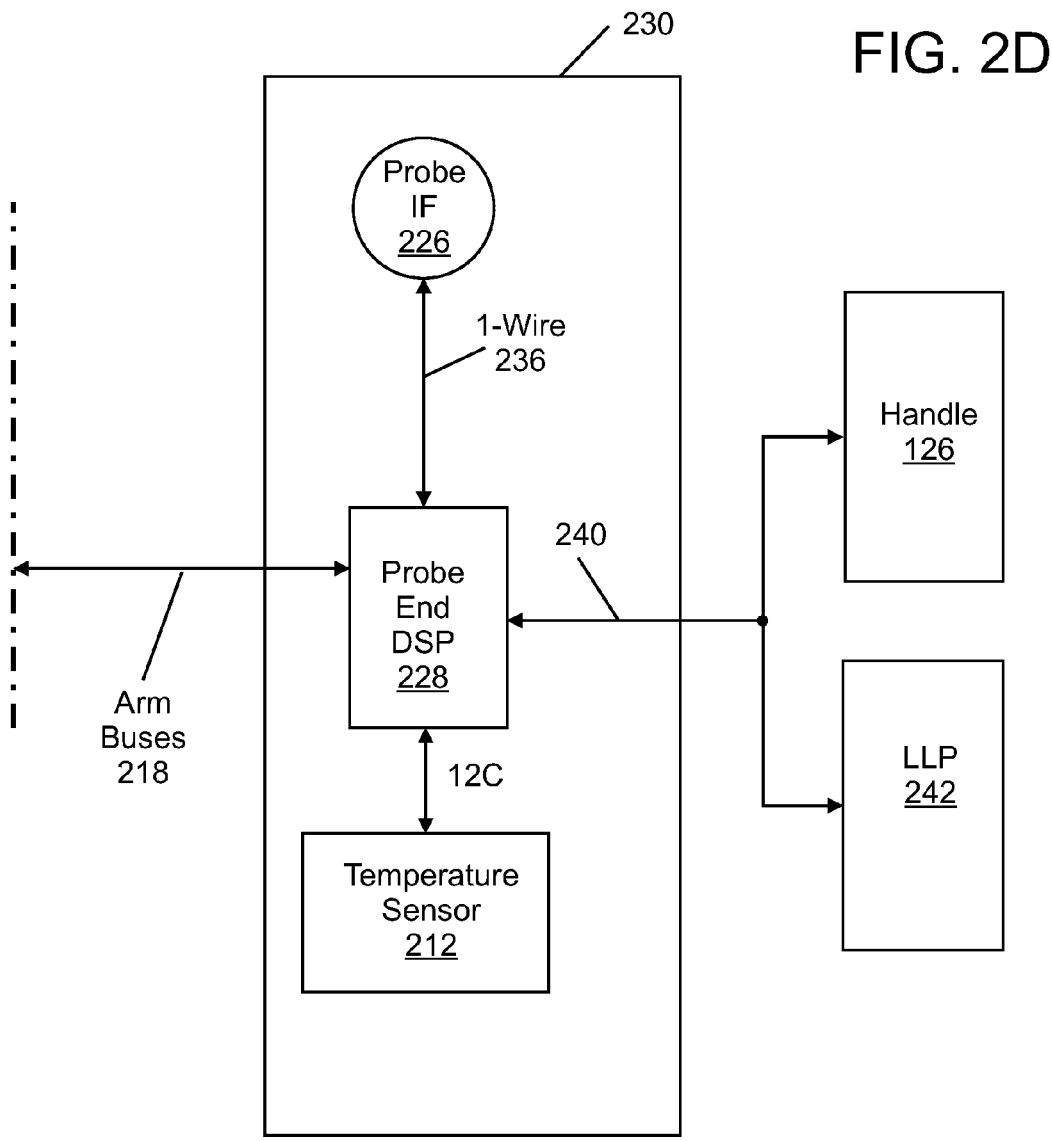
Figure 2:
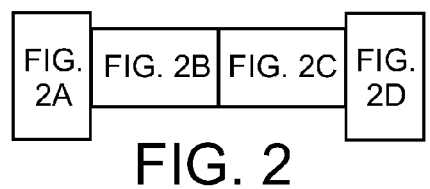

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

Figure 3A:
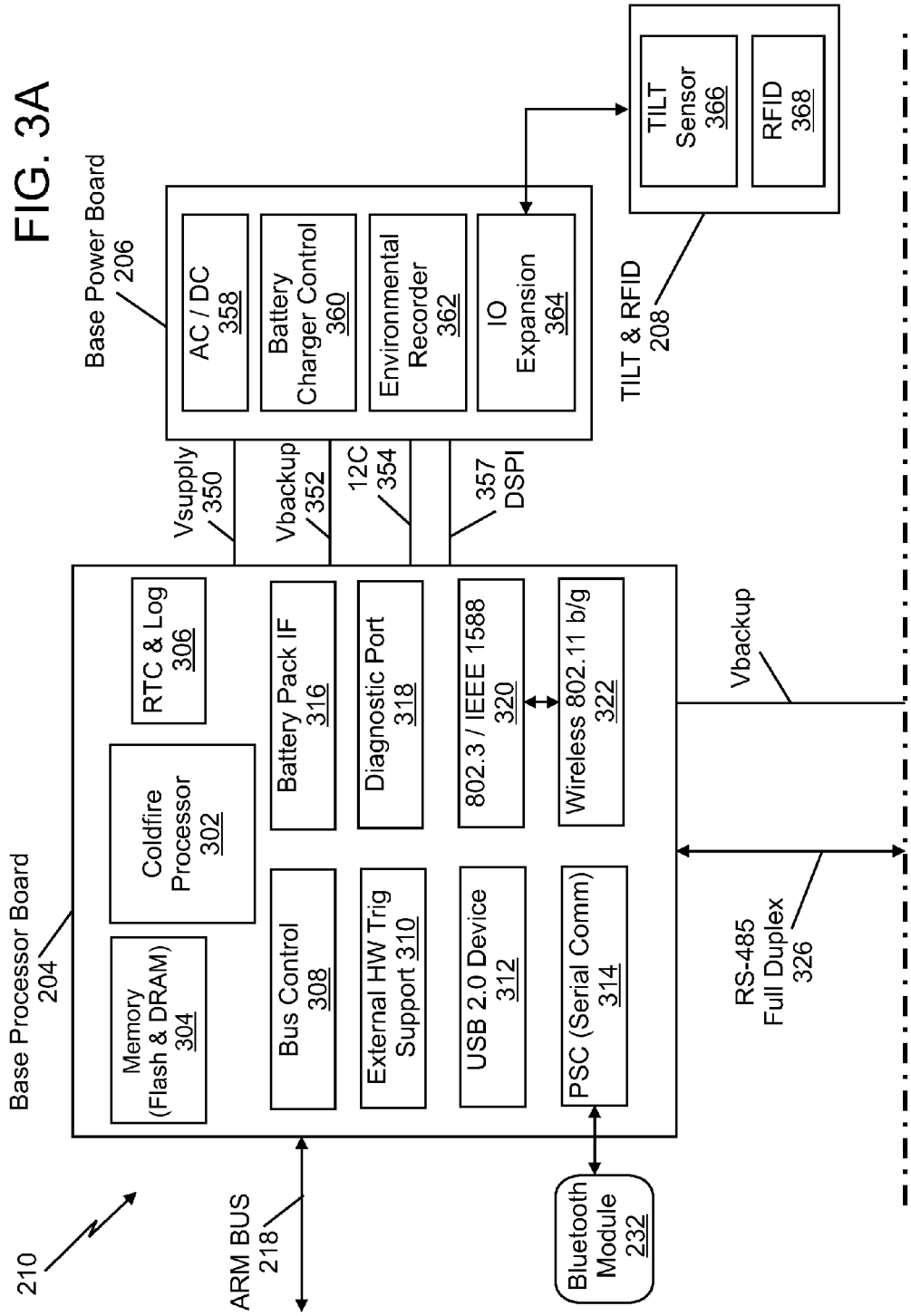

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

A plurality of different types of metrology devices, or a plurality of similar metrology devices, which are arranged, linked, connected, associated, configured, or set up together, whether or not physically attached in some manner, for example, as a system, may utilize embodiments of the time synchronization apparatus and method according to the present invention disclosed herein in order to accurately synchronize the various measurements taken by the multiple metrology devices within the system. In some embodiments, even non-metrology devices, such as for example a robot or a camera, may be utilized in embodiments of the present invention.

An exemplary embodiment of the present invention includes a system that comprises an articulated arm coordinate measuring machine, such as the portable AACMM 100 described herein above with respect to FIGS. 1-3, and a laser tracker configured together with respect to each other as described in detail herein after. The portable AACMM 100 and the laser tracker are time synchronized using the IEEE 1588 precision time protocol (PTP) standard, for example, for taking measurements of an object. More particularly, the exemplary embodiment described herein after relates to a portable AACMM 100 and a laser tracker used together to relocate the portable AACMM 100 to different physical locations so that the portable AACMM 100 can completely measure a relatively large part or object (e.g., an automobile), where such complete measurement is not possible if the portable AACMM 100 is not relocated to additional physical locations.

As described herein above, portable AACMMs 100 are used to obtain three dimensional position data with respect to an object, such as a part undergoing measurement. The portable AACMM 100 converts the physical object to a set of data representing the physical object. Additional details regarding portable AACMMs are found in the aforementioned commonly assigned U.S. Pat. No. 5,402,582 ('582) to Raab, which is incorporated herein by reference in its entirety.

A modern portable AACMM 100 is capable of measuring in a volume defined as being within a range extending up to the maximum reach of the arm portion 104 of the AACMM 100. This maximum arm reach may, for example, typically be six or twelve feet, depending primarily on the length of the arm segments 106, 108. Measuring outside of or beyond this volume while still maintaining an original or global coordinate system or frame of reference requires physically relocating the portable AACMM 100 to one or more other different physical locations and performing a coordinate system transfer procedure at each location, for example the procedure referred to as "Leap Frog." In the Leap Frog procedure, features in the first measurement volume (i.e., with the portable AACMM 100 in its initial physical location) are used to reset the coordinate system of the portable AACMM 100 after moving the portable AACMM 100 to a second, new or different physical location to continue the part measurement process (for example, when measuring an automobile or similarly large object). The portable AACMM 100 may also be relocated to a third, a fourth or additional different physical locations as necessary to successfully complete the part measurement process. The net result of the Leap Frog procedure is a stacking of any error since the portable AACMM 100 is consecutively used to re-establish its coordinate system. A more detailed description of the Leap Frog procedure is found in U.S. Pat. No. 4,430,796, which is incorporated herein in its entirety by reference.

An example of a relatively large-scale coordinate probing measurement system 400 is shown in FIG. 4, which is similar to the measurement system disclosed in the aforementioned commonly assigned U.S. Pat. No. 7,804,602, which is hereby incorporated by reference in its entirety. The probing system 400 of FIG. 4 comprises a portable AACMM 100 similar to that described herein above with respect to FIGS. 1-3 and shown in simplified form in FIG. 4. The system also comprises a retroreflector clamp assembly 410 located on the portable AACMM 100 at or near the probe end 420 of the AACMM 400, and a laser tracker 430. Other orientations, arrangements, set-ups, and variations of multiple measurement devices of the same type or different types are possible and contemplated by embodiments of the present invention, depending, for example, upon the specific application in the field. Thus, the exemplary system 400 of FIG. 4 should not be considered to be limiting.

FIG. 5 shows an exploded view of retroreflector clamp assembly 410, which comprises spherically mounted retroreflector (SMR) 500, kinematic nest 510, and clamp 520. SMR 500 comprises cube-corner retroreflector 530 embedded within partial sphere 540. Cube-corner retroreflector 530 comprises three flat mirror segments (M1, M2, M3), which are joined together in such a way that each glass segment makes a ninety-degree angle with respect to the other two glass segments. The point of common intersection of the three glass segments is called the apex "A" of SMR 500. The apex "A" is located at the spherical center of partial sphere 540.

Kinematic nest 510 attaches to the top of clamp 520, which in turn locks onto the final link or arm segment 550 of the portable AACMM 100 at or near the probe end 420. Thus, the clamp 520 allows the retroreflector clamp assembly 410 to be placed onto the portable AACMM 100 at a desired location.

Kinematic nest 510 has three point-like contacts (not shown) onto which the spherical surface of SMR 500 rests. These point-like contacts ensure that the center of SMR 500 remains at the same point in space as SMR 500 is rotated. Kinematic nest 510 preferably contains a magnet in its base to ensure that SMR 500 is kept in constant contact with the three point-like contacts.

As shown in FIG. 4, laser tracker 430 sends laser beam 440 to SMR 500. Cube-corner retroreflector 530 reflects the light sent from the laser tracker 430 back to the laser tracker 430 along the same line 440 as the outgoing laser beam. The laser tracker 430 monitors the position of the returning laser beam and adjusts the position of the tracker head 450 to keep the laser beam centered on SMR 500, even as the SMR 500 is moved from point to point. In this example, the operator moves the SMR 500 to three distinct positions (with the portable AACMM 100 held in the same physical location), but may also move the SMR 500 to twelve or more positions, or possibly one position only. At each SMR position, both the portable AACMM 100 and the laser tracker 430 take measurements of the coordinates of the SMR 500. The portable AACMM 100 does this by using its built-in angular encoders, which typically are located in the couplings (e.g., bearing cartridges) of the arm segments 106, 108 of the AACMM 100 with each other and with the base 116 of the portable AACMM 100 or with the final link 550. Laser tracker 430 does this by using its distance meter and angular encoders (not shown). Other types of encoders and distance meters may also be used.

By comparing this SMR measurement data collected by the portable AACMM 100 and the laser tracker 430, a transformation matrix may be determined for converting from the coordinate system of the portable AACMM 100 to the coordinate system of the laser tracker 430 or vice versa. Alternatively, both sets of data can be converted into some other preferred coordinate system (x, y, z).

When measuring a relatively large object (e.g., an automobile) with a portable AACMM 100, it is often necessary to physically move the entire portable AACMM 100 (or the portion of the AACMM 100 that performs the measurement function—i.e., the arm portion, with perhaps a laptop computer remaining in the same physical location throughout) to a different physical location. This is done to physically relocate the portable AACMM 100 to one or more other, different physical locations with respect to the object being measured so that the portable AACMM 100 can measure other portions of the large object that are not accessible for measurement from the first physical location of the portable AACMM 100. This action of moving the entirety or a portion of the portable AACMM 100 to a different physical location is referred to as "relocation." That is, "relocation" does not refer to the portable AACMM 100 being held in a single physical location while the user moves one or more portions of the portable AACMM 100 (e.g., arm segments, probe, etc.) to different positions.

Figure 6:
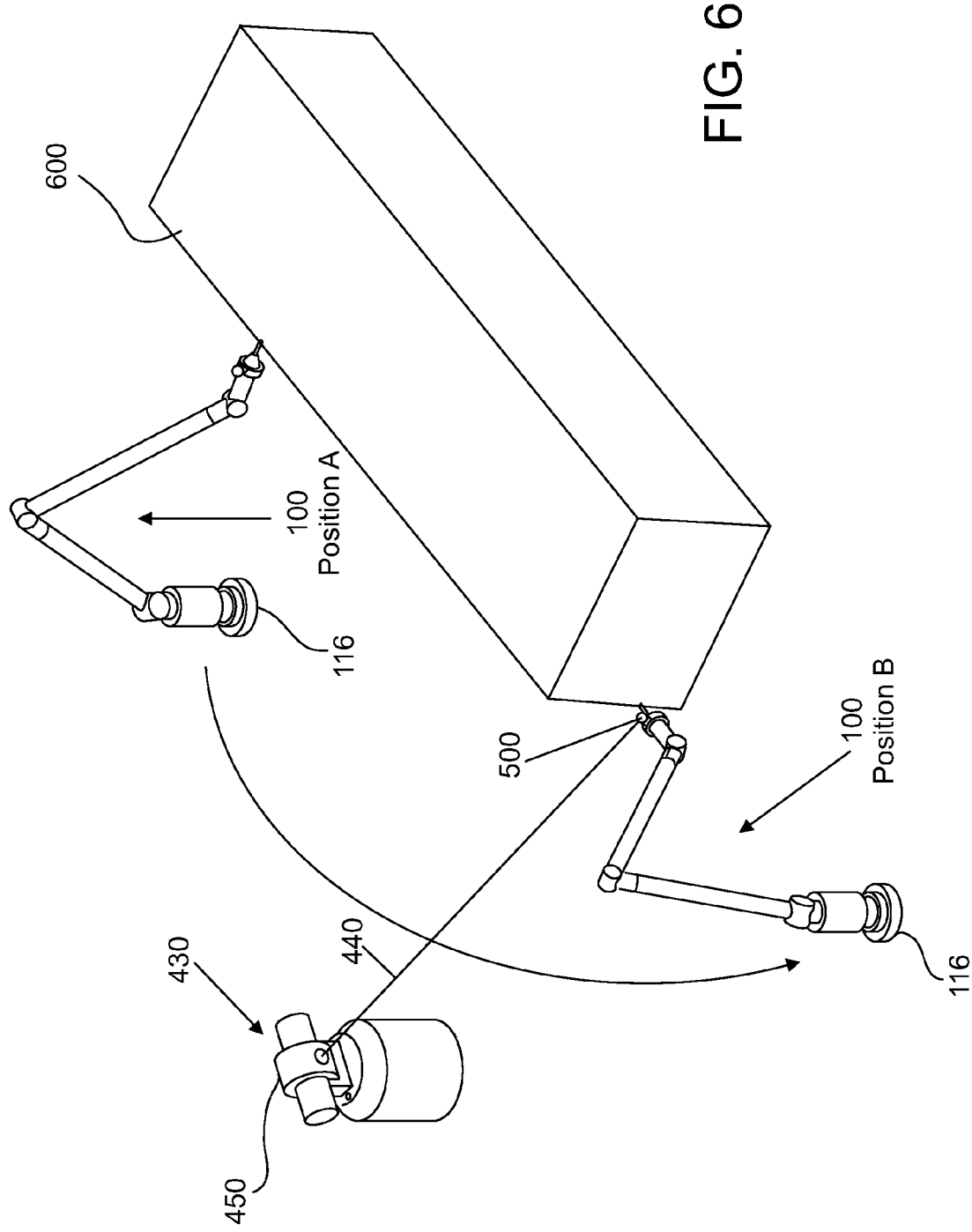
FIG. 6 is a perspective view of the portable AACMM of FIG. 1 relocated to a second position through the use of the laser tracker in the embodiments of the present invention of FIG. 4.

The above procedure of measuring the position of the SMR 500 simultaneously with both the portable AACMM 100 and the laser tracker 430 is performed whenever the portable AACMM 100 is relocated (see FIG. 6 where the portable AACMM 100 is moved from "Position A" to "Position B," for example—i.e., from a first physical location to a second physical location). This allows the measurement data with respect to a relatively large object 600 collected from the several different locations of the portable AACMM 100 to be seamlessly stitched together in the same common coordinate system in the same frame of reference (e.g., a global frame of reference). With the method described above, the portable AACMM 100 can be quickly and accurately relocated to any physical location within the measurement volume of laser tracker 430.

This procedure represents an improvement over other solutions where such a relatively easy relocation process is not possible because several targets (i.e., nests), for example, four targets, are usually placed on a floor as a frame of reference for a portable AACMM 100. Thus, the nests must also be relocated when a portable AACMM 100 is relocated and all points of reference need to be relatively recalibrated.

The following techniques may also be implemented to improve the accuracy of relocating a portable AACMM 100: (1) measure many points (for example, more than three) with the portable AACMM 100 and the laser tracker 430; (2) measure points separated as much as possible in three-dimensional space (that is, near the outer edges of the AACMM measurement volume or envelope); and (3) measure points covering all three dimensions (that is, avoid collecting points that lie entirely on or near a plane).

Figure 7:
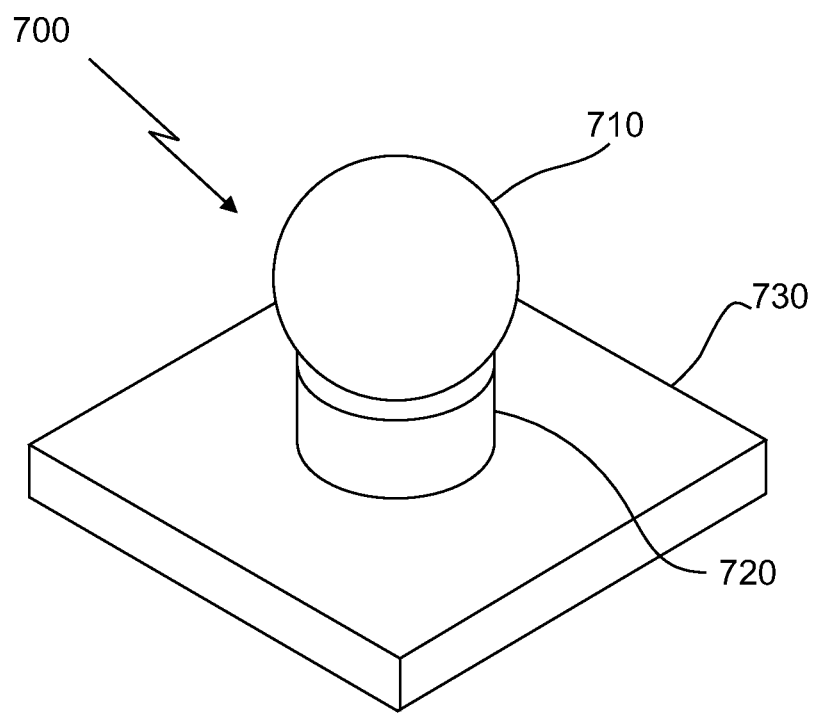
FIG. 7 is a perspective view of a mounted sphere assembly utilized with the portable AACMM of FIG. 1 in the embodiments of the present invention of FIG. 4.

When retroreflector clamp assembly 410 is first attached to the portable AACMM 100, the coordinates of SMR 500 must be found in relation to the frame of reference of the final link 550 of the AACMM 100 (see FIG. 9B). To do this, a compensation procedure is performed using the mounted sphere 700 shown in FIG. 7. This may also be termed an "initial compensation" procedure, because is it only necessary to be performed when the retroreflector clamp assembly 410 is first attached to the portable AACMM 100.

The mounted sphere 700 comprises metal sphere 710, magnetic nest 720, and base 730. Metal sphere 710 may have the same diameter as that of the SMR 500, for example. Magnetic nest 720 has three point-like contacts (not shown) onto which the metal sphere 710 rests. A magnet (not shown) holds metal sphere 710 securely against the three point-like contacts. Magnetic nest 720 is attached to base 730, which in turn is attached to the floor on another stable surface.

At the start of the compensation procedure to find the SMR position, SMR 500 is removed from kinematic nest 510. Kinematic nest 510 is brought in contact with metal sphere 710, which is sitting on magnetic nest 720. This is shown in FIG. 8A. Subsequently, the arm segments 106, 108 of the portable AACMM 100 are moved into a different position, as shown in FIG. 8B. The exact position of kinematic nest 510 is not important. By repositioning the arm segments at least one more time, but preferably many more times, the angles on the angular encoders of the portable AACMM 100 can be used to determine the position of the center of SMR 500.

The mathematics for determining coordinates using articulated arm segments such as are found on robots or portable AACMMs are well known. For example, the relevant equations are described in chapters 3 and 4 of *Robot Modeling and Kinematics* by Rachid Manseur. With these equations, one can relate the position $\vec{r}'$ of the center of metal sphere 710 within the frame of reference of final link 550 to the position $\vec{r}$ of the center of metal sphere 710 within the fixed frame of reference of the base 116 of the portable AACMM 100. Possible vectors $\vec{r}'$ and $\vec{r}$ for a particular AACMM are shown in FIGS. 9A and 9B. To clarify the meaning of these vectors, local coordinate systems $(x_A, y_A, z_A)$ and $(x_F, y_F, z_F)$ for the portable AACMM 100 and the final link 550, respectively, are shown in FIGS. 9A and 9B. In the case of the compensation procedure to find the coordinates of the SMR 500 as described above, the constraint of metal sphere 710 causes vectors $\vec{r}'$ and $\vec{r}$ to remain constant even as the arm segments of the portable AACMM 100 are moved about. The equation that relates the two vectors is:

$$\vec{r} = T(\vec{\theta}_i) \cdot \vec{r}' \qquad \text{(Eq. 1)}$$

In this equation, $T(\vec{\theta}_i)$ is a 4×4 transformation matrix that depends on the so-called Denavit-Hartenberg (DH) parameters for each link, as explained in the book by Manseur cited above. For each link, only one of DH parameters, the link angle θ, varies during the compensation procedure. The other DH parameters are characteristic of a particular portable AACMM 100 and will already have been determined by a factory compensation procedure carried out at the time the portable AACMM 100 is manufactured. The fixed parameters are determined by a separate factory compensation procedure. The vector notation $\vec{\theta}_i$ indicates that T is a function of the angular encoder readings for all of the coupling points in the AACMM 100, and i indicates the $i^{th}$ measurement, where each measurement corresponds to a different position of the portable AACMM 100, two example positions of which are shown in FIGS. 8A and 8B. If the portable AACMM 100 is moved to a large number of different positions, there will not be a unique solution to Equation (1). Instead, the best estimate of the vectors $\vec{r}'$ and $\vec{r}$ is made by minimizing the total residual error. For the $i^{th}$ measurement, the residual error is defined as:

$$\text{a. res}_i = |T(\vec{\theta}_i) \cdot \vec{r}' - \vec{r}| \qquad (\text{Eq. 2})$$

To minimize the total residual error, $\vec{r}'$ and $\vec{r}$ are selected to minimize the sum of the square of the $\text{res}_i$ values. In this case, $\vec{r}'$ and $\vec{r}$ are each represented by three coordinate values (for example, x, y, and z), so that there are six parameter values that need to be found. The procedure for selecting parameters to minimize a sum of squared values is well known in the art and is readily carried out using widely available software. This procedure will therefore not be discussed further.

As mentioned previously, the portable AACMM 100 is conveniently relocated by simultaneously measuring the position of SMR 500 with both the AACMM 100 and the laser tracker 430, with SMR 500 moved to several different positions. The measurements collected by the AACMM 100 are related to the measurements of laser tracker 430 through the equation:

$$\vec{s} = M(rx,ry,rz,tx,ty,tz) \cdot \vec{s}' \qquad (\text{Eq. 3})$$

In this equation, $\vec{s}$ and $\vec{s}'$ are the coordinates of the SMR 500 in the frame of reference of laser tracker 430 and the frame of reference of the portable AACMM 100, respectively. The quantities rx, ry, rz are the Euler angles representing rotations about the X, Y and Z axes respectively, and tx, ty, tz are the displacements in X, Y and Z respectively. The matrix M (rx, ry, rz, tx, ty, tz) transforms the coordinates of SMR 500, as measured by the relocated portable AACMM 100, into the frame of reference of laser tracker 430 which in this example is the common coordinate frame of reference. However, it possible to use, or assign, any suitable frame of reference to be the common coordinate frame of reference. This matrix M (rx, ry, rz, tx, ty, tz) is the entity determined by the relocation procedure, and it the matrix may be computed in any suitable means such as in a processor or in software, for example. Once it is known, it can equally be applied to a measurement of a probe tip 420 attached to the final link 550. The probe tip 420 coordinate, as measured by the portable AACMM 100, is transformed by matrix M (rx,ry,rz,tx,ty,tz) to give the coordinates of the probe tip 420 in the frame of reference of laser tracker 430.

To find M (rx,ry,rz,tx,ty,tz), the residual error for the $i^{th}$ measurement is defined as:

$$\text{res}_i = |M(rx,ry,rz,tx,ty,tz) \cdot \vec{s}' - \vec{s}| \qquad (\text{Eq. 4})$$

A standard least-squares fit calculation is performed to find the values of the six fit parameters rx, Ty, rz, yx, ty, tz that minimize the sum of the squares of the residual errors.

Other apparatus and methods for performing a relocation of the portable AACMM 100 using both the portable AACMM and a laser tracker may be utilized in light of the teachings herein.

In the disclosure herein above, when the portable AACMM 100 is relocated to a different physical location, the position of the SMR 500 is simultaneously measured by both the portable AACMM 100 and the laser tracker 430. This "simultaneous measurement" is performed each time the SMR 500 is moved to one or more different positions. As such, it is important that the portable AACMM 100 and the laser tracker 430 be synchronized in time as accurately as possible such that the any error in the position of the SMR 500 as measured simultaneously by the portable AACMM 100 and by the laser tracker 430 is as small as possible and is an acceptable value for such precise metrology applications.

Apparatus and methods according to embodiments of the present invention may utilize the IEEE 1588 precision time protocol (PTP) for time synchronizing both the portable AACMM 100 and the laser tracker 430. Such apparatus and methods may be implemented within both the portable AACMM 100 and the laser 430 tracker of the relocation embodiment of FIGS. 4-9, discussed herein above. Such apparatus and methods according to embodiments of the present invention may utilize the IEEE 1588 PTP for time synchronizing the real time clocks of many other distributed network system combinations of "nodes" (e.g., metrology devices) that are all similar (e.g., a plurality of like laser trackers) or are different (e.g., a portable AACMM and a laser tracker), or that even include non-metrology devices such as cameras, robots or other industrial equipment, for example.

Besides the relocation embodiments of a portable AACMM and a laser tracker and described herein above, it may also be necessary to occasionally calibrate such a system combination of metrology devices. To perform such a calibration, an SMR 500 may be affixed to the last link 550 or to some other location on the portable AACMM 100 (FIG. 4). The laser tracker 430 then measures the position of the SMR 500 relative to its reference frame while the portable AACMM 100 simultaneously measures the position of its probe 420 (and, thus, that of the SMR 500). From this information, the reference frame of the AACMM 100 relative to the laser tracker 430 can be established. Then, after calibration, the portable AACMM 100 and the laser tracker 430 may measure independently of each other. From time to time the position of the portable AACMM 100 may be re-captured (i.e., the SMR 500 re-acquired) to check and confirm calibration or to relocate the portable AACMM 100 to a new location, as described herein above. As in the relocation embodiments, in the calibration embodiments of the portable AACMM 100 and the laser tracker 430 it is desirable that the portable AACMM 100 and the laser tracker 430 be synchronized in time as accurately as possible such that the any error in the position of the SMR 500 as measured simultaneously by the portable AACMM 100 and by the laser tracker 430 is as small as possible and is thus an acceptable value for such precise metrology applications.

As mentioned herein above in the relocation and calibration embodiments of a portable AACMM 100 and a laser tracker 430 combined together, the measurement or "acquisition" of the SMR 500 located on the portable AACMM 100 is used to establish the reference location of the portable AACMM 100 so that when the SMR 500 is out of the line of sight of the laser tracker (e.g., by moving the SMR 500 too quickly or by obstruction of the SMR 500 by an intervening object), measurements made by the portable AACMM 100 may nevertheless proceed uninterrupted. Using a plurality of laser tracker measurements taken for the SMR 500 on the portable AACMM 100 while the AACMM is moving will improve the accuracy in determining the portable AACMM's reference location. There are two reasons for this. Firstly, from statistics taking N samples reduces the ambiguity of each position by the factor $$\frac{1}{\sqrt{N}}.$$

Also, using multiple AACMM orientations rather than a single orientation of the portable AACMM 100 reduces the probability that a single worst case AACMM position error influences the result. Constantly moving the SMR 500 and consequently the encoders within the portable AACMM 100 provides the ability to more accurately determine the AACMM reference position through use of the average position of the AACMM 100. This is the same concept used in single point calibration.

With respect to multiple devices (e.g., precision metrology devices such as portable AACMMs and laser trackers) connected together within a distributed network system (either through wired and/or wireless communications capabilities), to achieve dynamically coordinated measurement and/or control, a communications network typically must display deterministic behavior. This means always being able to exchange the required amount of data in a pre-defined time period with the ability to precisely time synchronize all participating devices (e.g., the real time clocks within the portable AACMM 100 and the laser tracker 430 in the above disclosed embodiments).

Some of the representative network demands placed on the hardware and software elements include the clock and scheduling, the data management and message protocols, the bandwidth, the buffering, and the synchronization. The current wired (IEEE 802.3) and wireless (IEEE 802.11) standards provide for the relatively best network solutions. Currently, Ethernet (IEEE 802.3) is the leading candidate for wired network connectivity applications, while Wi-Fi wireless (IEEE 802.11) is the leading candidate for local wireless network connectivity applications.

Some of the advantages of Ethernet include it being relatively inexpensive to implement and offering widespread use, for example, in office and industry applications. The Ethernet is also versatile; for example, wire and fiber configurations may be implemented, as well as half or full-duplex implementations. Also, industrial Ethernet protocols are available (e.g., Real Time Ethernet), and multiple topologies are available. Further, Power Over Ethernet (PoE) allows for a single cable to provide signal and power. Ethernet is also relatively easy to secure and segment, and also provides support for the IEEE 1588 PTP, which is discussed in more detail herein after.

Some of the advantages of Wi-Fi wireless include it being relatively inexpensive to implement and offering widespread use, for example, in office and industry applications. Also with Wi-Fi wireless stations can be moved relatively easily. Further, coverage can be extended by relaying messages. Wi-Fi wireless also offers relatively low power consumption; for example, battery power can be used. There is also an abundance of hardware and software for support and Wi-Fi wireless also provides support for the IEEE 1588 PTP.

In the various embodiments of the apparatus and methods of the present invention, the relatively high level of accuracy with respect to time synchronization between the plurality of precision metrology devices is achieved through use of hardware assisted IEEE 1588 time synchronization operation, as described in detail hereinafter. For example, an embodiment may comprise a portable AACMM having an LLP connected to the probe end of the AACMM, along with a laser tracker separate from the AACMM. If the movement of the portable AACMM with the LLP is one meter per second and the synchronization timing error is one millisecond (typical of an IEEE 1588 PTP system using a software only approach), the resulting position error caused by the synchronization timing error is given by the product of the arm velocity magnitude and the change in the synchronization error. In this example, the position error is one millimeter, which is relatively much larger (two orders of magnitude) than the combined errors of the laser tracker and portable AACMM. For precision 3-D metrology, it is desirable that the synchronization timing error be less than one microsecond (and preferably approximately no more than 500 nanoseconds) to produce a negligible position error. A hardware assisted IEEE 1588 PTP approach in general can meet the desired level of accuracy whereas a software assisted IEEE 1588 PTP approach in general cannot.

A clock is typically a two-part device. The first part is an oscillator that provides equally spaced (in time) periodic events. The second part is a counter that adds up (also known as an integrator, adder or accumulator) these events. Perceived time from a clock is influenced primarily by three elements. The first is caused by delay perturbations (communications path disturbances from the clock to the receiver of the time information). The second is the variability of the clock time base itself (type of time base). The third element is any environmental influence over the clock's timing.

To achieve the desired level of time synchronization precision (e.g., a maximum acceptable error of approximately no greater than 500 nanoseconds) between a plurality of similar or different precise metrology devices (e.g., laser trackers, portable AACMMS) and/or other types of devices (e.g., industrial robots and equipment) connected, arranged or otherwise combined together, for example, in a system, for wired and/or wireless communications between the devices, it is preferred that a hardware based implementation of the IEEE 1588 PTP be implemented in exemplary embodiments of the apparatus and methods of the present invention, instead of a software based implementation, for reasons that will be discussed in detail herein after.

As background information regarding the IEEE 1588 PTP, a first version (Version 1) of the standard was released in 2002, while a revised version (Version 2) was released in 2008. The IEEE 1588 PTP describes a hierarchical master-slave architecture for clock distribution within a network of devices. The IEEE 1588 PTP synchronizes real time clocks in distributed networks. The networked clocks are organized in a master-slave hierarchy in which a two-way exchange of information occurs between the master clock device and each of the slave clock devices in order to keep all of the clocks within the desired precise level of time synchronization. Under the master-slave hierarchical architecture, a time distribution system comprises one or more communication mediums (network segments) and one or more clocks. An ordinary clock is a clock with a single network connection and is either the source of (master) or destination for (slave) a synchronization reference. A boundary clock has multiple network connections and can accurately bridge synchronization from one network segment to another. A synchronization master is elected for each of the network segments in the system. A grandmaster clock is the root timing reference for the entire system. The grandmaster clock transmits synchronization information to the other clocks residing on the same network segment as the grandmaster. The boundary clocks with a presence on that segment then relay accurate time to the other segments to which they are also connected.

In IEEE 1588 Version 2 a type of clock called a transparent clock was defined as an improved method of forming cascaded segment topologies. It is in fact an enhanced Ethernet switch. A transparent clock can replace a boundary clock. A transparent clock monitors PTP messages between master and slaves and inserts local time delay data (residence time) into the current PTP frame. There are two types of transparent clocks, end-to-end (E2E) and peer-to-peer (P2P). P2P transparent clocks are different than E2E in that each port on a P2P transparent clock additionally computes the peer link path delay with its link partner (at the ingress or upstream side) and includes this data in the correction field of the PTP frame.

A simplified PTP system frequently comprises a number of ordinary clocks connected to a single network. In this case no boundary clocks are utilized. A grandmaster clock is elected and all other clocks synchronize directly to it. Generally in the IEEE 1588 PTP a "Best Master Clock" algorithm determines the "best" or most accurate clock within the system to which all other clocks in the system will then synchronize to. This determination of the master clock is made based on a number of different properties of each clock. For example, clocks may pair up and compare embedded clock attributes. All clocks operate on the same information and draw the same conclusions.

FIG. 10 illustrates a simplified PTP system in which a grandmaster clock 1000 serves as a timebase for the entire system, which includes one or more slave clocks 1010. IEEE 1588 PTP Version 2 adds some additional clock types to those within Version 1. In a precision metrology device system, the grandmaster clock 1000 may reside within one of the metrology devices, such as the portable AACMM of FIG. 4, while the slave clock 1010 may reside within another one of the metrology devices, such as the laser tracker 430 of FIG. 4. The slave clock 1010 within the laser tracker 430 may then use the IEEE 1588 PTP to synchronize itself time-wise to the grandmaster clock 1000 within the portable AACMM 100. This way, measurement accuracy between the two precision metrology devices 100, 430 may be within an acceptable value of 500 nanoseconds.

Time synchronization and management of a system implementing a hardware assisted IEEE 1588 PTP is achieved through the exchange of information in the form of packets or messages (e.g., "PTP packets" or "PTP messages") across the communication medium (e.g., the local area network (LAN) or wireless LAN connecting a master and each slave). To this end, the IEEE 1588 PTP uses the following basic messages that are exchanged between the various devices: Sync, Delay_Req, Follow_Up and Delay_Resp. These messages are used by the various clocks to communicate time-related information ("timestamps") across the network in order to time synchronize each of the slave clocks to a grandmaster clock. Other messages or packets are available with both versions of the IEEE 1588 PTP. Some of the messages are characterized as event messages in that they are time-critical messages in which accuracy in transmission and receipt of timestamp accuracy directly affects clock distribution accuracy. Other messages are characterized as general messages in that they are more general protocol data units in that the data in these messages are of import to PTP but their transmission and receipt timestamps are not. The various messages defined within the IEEE 1588 PTP may be transmitted using multicasting, which is the type of distributed system that Ethernet supports.

FIGS. 11 and 12 illustrate an example of how a slave clock 1010 uses the IEEE 1588 PTP to time synchronize itself to the master clock 1000. In order to do so, each slave clock 1010 must accurately determine the network transit time of the Sync messages sent by the master clock 1000. The transit time is determined indirectly by measuring the round-trip time from each slave clock 1010 to its master clock 1000.

At time t0, the master clock 1000 sends the Sync message out to all of the slave clocks 1010 via multicasting (in either Version 1 or Version 2 of the IEEE 1588 PTP) or to a specific slave clock 1010 via unicasting in Version 2 of the IEEE 1588 PTP. This may be done periodically by the master clock 1000 (e.g., in Version 1 of the IEEE 1588 PTP it is done up to once per second, while Version 2 allows for the Sync message to be broadcast by the master clock 1000 up to ten times per second). When a slave clock 1010 receives the Sync message, the slave clock 1010 timestamps the local time, t1, of that slave clock 1010. The master clock 1000 then sends the message Follow_Up to the slave clock 1010. The Follow_Up message contains the time that the master clock 1000 sent the prior Sync message. Each slave clock 1010 then calculates the time difference between t1 and t0 to arrive at the offset plus the delay, which, for example is quantity A.

Next, as shown in FIG. 12, the slave clock 1010 sends the Delay_Req message to the master clock 1000 at time t2. The master clock 1000 then sends the Delay_Resp message to the slave clock 1010, wherein the Delay_Resp message contains the time, t3, that the master clock 1000 received the Delay_Req message from the slave clock 1010. The slave clock 1010 then calculates the time difference between t3 and t2 to arrive at the offset minus the delay, which, for example, is quantity B.

The slave clock 1010 can then calculate the offset as $(A-B)/2$ and can also calculate the delay as $(A+B)/2$. Once the slave clock 1010 knows the offset between itself and its master clock 1000, the slave clock 1010 can correct itself by the amount of the offset to bring the slave clock 1010 into agreement with the master clock 1000. That is, the time of day of the slave clock 1010 can be set to the time of day of the master clock 1000.

Additionally, the IEEE 1588 PTP allows for a slave clock 1010 to calculate any drift or frequency difference between the oscillator in the slave clock 1010 and the oscillator in the master clock 1000. This can be accomplished by having the master clock 1000 send out consecutive timestamped Sync and Follow-Up messages to the slave clock 1010.

With use of the IEEE 1588 PTP, it is known that hardware timestamping is more accurate in terms of time synchronization than software timestamping. This is achieved primarily through reduction of protocol stack jitter. Jitter typically describes timing deviations of cyclic events. Network jitter is the jitter caused by the network and its components, including all connected devices. For example, Ethernet software is typically divided up into various layers, where each layer removes or adds a block of information called a header before handing it up or down the Ethernet protocol stack or "switch fabric." There are two types of models that are documented, which are the OSI (historic) and the TCP/IP (Internet) model. In each model the top of the protocol stack is that layer which is farthest from the network physical interface, where the layer closest to the network physical interface is generally referred to as the PHY layer, which is where a physical device such as a network hub resides.

Software timestamping in the IEEE 1588 PTP results in relatively lower time synchronization accuracy than hardware timestamping because the timestamping occurs at the top layer of the protocol stack in the master clock as well as in all slave clocks. As such, the timestamp must travel down through the entire Ethernet protocol stack in the master clock before being placed onto the network. Then the timestamp must travel up through the entire protocol stack in each slave clock. As the timestamp travels through the protocol stack, typically many milliseconds of variation are introduced due to protocol stack jitter. Also, as the timestamp travels over the network hundreds of nanoseconds to microseconds of variation are introduced by repeater and switch jitter, while milliseconds are typically introduced by router jitter.

In contrast, hardware timestamping is generally carried out closer to the PHY level in the Ethernet protocol stack. For example, in the master clock the MAC layer, which is typically located just above the PHY layer in the protocol stack, may carry out the timestamping, while in the slave clock, the PHY layer may carry out the timestamping. In this way the hardware timestamping technique removes many milliseconds of variation introduced by the protocol stack jitter that is inherent in software timestamping. Semiconductor integrated circuit devices are available (e.g., the model DP83640 from National Semiconductor Corporation) that implement the hardware timestamping at the PHY layer by adding this functionality to the PHY layer in the Ethernet protocol stack.

The IEEE 1588 PTP specifies an algorithm for clock adjustment or compensation. A widely used algorithm within the IEEE 1588 PTP is to adjust a slave clock based on PTP measurements. This can be accomplished by speeding up or slowing down the slave clock 1010 (i.e., a rate adjustment) until its offset with respect to the master clock 1000 converges to zero (for example, through use of a Proportional/Integral (P/I) servo). The servo input is the "offset" computed from the communicated timestamps in the messages. See also the Intel Corporation Application Note titled "*Utilizing IEEE with Intel® EP80579 Integrated Process Product Line*," (September 2008), which is incorporated herein by reference in its entirety.

A common known way in the prior art of implementing a variable hardware clock in a processor within a slave clock 1010 is by use of a phase accumulator 1300, as seen in FIG. 13. The phase accumulator is a modulo-M counter of length $2^n$. That is, the value of the $2^Q$-bit counter (or accumulator) is incremented by the value M (tuning word) each time a reference clock pulse is received. When the overflow flag (flag when the count exceeds $2^n$) is used as the output, the following relationship between the output frequency and reference frequency is given by:

$$F_{out} = (M \times F_{ref})/2^n \quad \text{(Eq. 5)}$$

where: $F_{out}$ equals the output frequency of the phase accumulator, $F_{ref}$ equals the reference clock frequency (e.g., the processor clock), n equals the length of the phase accumulator, and M equals the tuning word.

Referring to FIG. 14, there illustrated is a block diagram of IEEE 1588 PTP clock control using a phase accumulator as is known in the prior art. Some of the definitions used in the following discussion include: FreqOsc is the input clock frequency, FreqClk is the frequency compensated clock (i.e., the desired output frequency), FreqDivRatio is the frequency divide ratio which equals FreqOsc/FreqClk, and FreqCompValue is the value used to set the FreqDivRatio. The computational logic elements included within FIG. 14 are a Q-bit Accumulator 1400, an R-bit Addend Register 1404, a P-bit System Clock Counter 1408, an IEEE 1588 Clock Reference 1412, and Message and Timestamp Logic 1416.

The phase accumulator is a Q-bit accumulator to which an addend value is added at a rate equal to 1/FreqOsc, which will result in a carry rate of 1/FreqClk. That is, a carry will result FreqCompValue times in $2^Q$ clock tics, where a clock tic occurs every 1/FreqOsc seconds. If the carry out is used as the FreqClk (the nominal clock rate desired) then the following is derived. Let FreqCompValue equals Addend. For R<=Q $$FreqClk = FreqOsc \cdot \left(\frac{FreqCompValue}{2^Q}\right) \quad \text{(Eq. 6)}$$

Repeat Pattern: A periodic pattern (beginning and ending with accumulator equal 0) occurs with a number of carries per cycle equals FreqCompValue/gcd(FreqCompValue, $2^Q$) for a number of clock tics (additions) equals $2^Q$/gcd (FreqCompValue, $2^Q$). Note the greatest common divisor (gcd) of two or more non-zero integers is the largest positive integer that divides both numbers without remainder.

Frequency and Time Adjustment Resolution: From the definitions above $$FreqDivRatio = FreqOsc/FreqClk = \frac{2^Q}{FreqCompValue} \quad \text{(Eq. 7)}$$

$$FreqCompValue = \frac{2^Q}{FreqDivRatio}$$

Frequency: For a change in the FreqCompValue the change in FreqClk is as follows:

$$\Delta FreqClk = \frac{\Delta FreqCompValue}{2^Q} \cdot FreqOsc \quad \text{(Eq. 8)}$$

$$\frac{\Delta FreqClk}{FreqClk} = \frac{\Delta FreqCompValue}{2^Q} \cdot \frac{FreqOsc}{FreqClk} \quad \text{(Eq. 9)}$$

$$\frac{\Delta FreqClk}{FreqClk} = \frac{\Delta FreqCompValue}{2^Q} \cdot FreqDivRatio \quad \text{(Eq. 10)}$$

Time: The period of FreqOsc and FreqClk are $$T_{FreqOsc} = \frac{1}{FreqOsc}$$

$$T_{FreqOsc} = \frac{1}{FreqClk}$$

A change in FreqCompValue results in a change in the period of FreqClk as follows:

$$\Delta T_{FreqClk} = \quad \text{(Eq. 11)}$$

$$-\Delta T_{FreqOsc} \cdot \left(\frac{2^Q}{FreqCompValue}\right) \cdot \frac{\left(\frac{\Delta FreqCompValue}{FreqCompValue}\right)}{\left(1 + \frac{\Delta FreqCompValue}{FreqCompValue}\right)}$$

Using Equation 7

$$\Delta T_{FreqClk} = -\Delta T_{FreqOsc} \cdot FreqDivRatio \cdot \left( \frac{\frac{\Delta FreqCompValue}{FreqCompValue}}{1 + \frac{\Delta FreqCompValue}{FreqCompValue}} \right) \quad (Eq. 12)$$

Dividing each side by $T_{FreqClk}$ yields the relative change of FreqClk as a function of ΔFreqCompValue.

$$\frac{\Delta T_{FreqClk}}{T_{FreqClk}} = \frac{-T_{FreqOsc}}{T_{FreqOsc}} \cdot FreqDivRatio \cdot \frac{\left( \frac{\Delta FreqCompValue}{FreqCompValue} \right)}{\left( 1 + \frac{\Delta FreqCompValue}{FreqCompValue} \right)}$$

Using FreqDivRatio=FreqOsc/FreqClk $$\frac{\Delta T_{FreqClk}}{T_{FreqClk}} = -1 \cdot \left[ \frac{\left( \frac{\Delta FreqCompValue}{FreqCompValue} \right)}{\left( 1 + \frac{\Delta FreqCompValue}{FreqCompValue} \right)} \right] \quad (Eq. 13)$$

Approximation.

$$\frac{\Delta FreqClk}{FreqClk} = -1 \cdot \frac{\Delta T_{FreqClk}}{T_{FreqClk}} \quad (Eq. 14)$$

Note that the jitter (phase step correction)

$$Jitter(\varepsilon) = \pm \frac{1}{FreqOsc} \quad (Eq. 15)$$

Specific to the aforementioned DP83640 integrated circuit: FreqOsc=125 MHz, Q=35, FreqDivRatio=1.00006399.
Using Equation 8

$$\Delta FreqClk = \frac{\Delta FreqCompValue}{2^Q} \cdot FreqOsc$$

The change in FreqClk can be expressed as a function of FreqOsc (reference).

$$\frac{\Delta FreqClk}{FreqOsc} = \frac{\Delta FreqCompValue}{2^Q} \quad (Eq. 16)$$

The resolution of changes in FreqClk relative FreqOsc can be found by letting FreqComp Value=1 (i.e. per increment).

$$\frac{\Delta FreqClk}{FreqOsc} = \frac{1}{2^Q} = 2.9103830457 \times 10^{-11} \text{ per } \Delta freqCompValue$$

increment.

Re-arranging Equation 15

ΔFreqCompValue=$2^Q$*(ΔFreqClk)/FreqOsc

Since FreqOsc/FreqClk=FreqDivRatio we can express the required change in ΔFreqCompValue for a change of ΔFreqClk/FreqClk by multiplying the left side by the FreqDivRatio.

ΔFreqCompValue=$2^Q$·FreqDivRatio(ΔFreqClk/FreqClk) (Eq. 17)

EXAMPLE

Solve for ΔFreqCompValue to Adjust ΔFreqClk/FreqClk 1953 ppm.

ΔFreqCompValue=$2^Q$·FreqDivRatio·(1953·$10^{-6}$)
ΔFreqCompValue=67108863 (3FF FFFFh DP83640 correction value)

With regard to wireless network types, the network topology of an infrastructure wireless local area network (WLAN) is a point-to-point multipoint star, with a single central controller (e.g., a wireless access point or a wireless router), and one or more wireless clients (e.g., stations). Clients can connect to one and only one access point, and not to other clients. An access point can connect only to clients and not to other access points. An access point is similar to a base station in a cellular network, and may perform wireless-to-wired bridging. An access point may connect with a distribution system or backbone network, which typically is the Ethernet. In a larger office, or a large and oddly shaped residence, a single access point may not provide coverage out to the corners of the area. The overall 802.11 standard provides for a network in which multiple access points are connected to the wired portion of the network, operating from the same router. Such a network is called an extended service set (ESS). In an ESS all access points share the same network name or service set identifier (SSID). In a basic service set (BSS), a group of communicating stations are arranged in a basic service area, similar to a cell in a cellular network. One may switch between different modes; for example, either an access point or a client, but not both at the same time.

In contrast to an infrastructure network (WLAN), the network topology of an ad hoc WLAN is a fully connected matrix, with two or more wireless clients connecting to each other, without a central controller. Connecting an ad hoc network to other networks (e.g., the Internet) typically involves bridging or routing in one of the wireless clients (e.g., a Windows Internet Connection Sharing) to some other network connection.

In embodiments of the apparatus and methods of the present invention, an infrastructure network may be utilized and may be preferred as such a network is relatively easier for security maintenance and development of the IEEE 1588 PTP master clock algorithm. However, other embodiments of the present invention that utilize an ad hoc network are not precluded.

A wireless access point is the central bridge device used in an infrastructure (as opposed to an ad hoc) wireless network. Traffic from the wireless side of the bridge is sent to the Ethernet or wired side of the bridge and vice versa. The access point typically controls all wireless traffic. A wireless router typically comprises three sections: (1) an Ethernet router having an DHCP client and server, a network address translation (NAT) that translates IP addresses, a port address translation (PATP that translates ports, and optionally a firewall; (2) an Ethernet switch; and (3) an access point. Additional elements may include a DSL modem, a cable modem or a wide area network (WAN) port to interface with either the DSL modem or cable modem. Note that a wireless router, oftentimes less expensive than an access point, can be configured to work as an access point.

In exemplary embodiments of the apparatus and methods of the present invention, a network configured for the IEEE 1588 PTP may have the following attributes. For example, the domain separation may comprise a single subnet (i.e., only one master/boundary clock). FIG. 15 is a block diagram showing a plurality of metrology devices together with other devices connected by wired and wireless connections to a wireless router and on to a network. For example, a portable articulated arm coordinate measuring machine (AACMM) 1500 similar to that of FIG. 1, along with an AACMM having a scanner attached to the AACMM (i.e. arm plus scanner 1504) and a laser tracker 1508 may each be connected by a wired connection to a wireless router 1512, as indicated by the dashed lines in FIG. 15. Other third party devices 1516 such as sensors, robots, etc. may also be connected by a wired or wireless connection to the wireless router 1512. In addition, a scanner and/or camera station 1520 may not be directly connected to the router 1512 but may nevertheless communicate wirelessly. The wireless router 1512 acts as an access point for the LAN that includes the various devices 1500, 1504, 1508, 1512 connected thereto by the wired connection, these devices being referred to as "nodes" due to their wired connection to the router 1512, which the scanner and/or camera station 1520 being referred to as a "station" due to its wireless connection to other devices with which it communicates. The router 1512 also acts as protection for the wired devices 1500, 1504, 1508, 1516 being in wired connection in an Ethernet LAN type of connection with the router 1516. That is, the router 1512 protects the Ethernet connected devices from the Enterprise Network or Real Time Industrial Network to which the router is also attached.

In FIG. 15, the devices 1500, 1504, 1508, 1516 may be Wi-Fi stations that are implemented as a defended or "protected" network cluster or "cloud." That is, while these devices are connected to the router 1512, they nevertheless can communicate wirelessly with the access point of the router, to exchange measurement data. As such, it is important that these devices be accurately synchronized in time using the IEEE 1588 PTP in embodiments of the present invention. Essentially, the devices 1500, 1504, 1508, 10516 are taking measurement data in the foreground and exchanging the data with one another via the access point in the foreground, while the embodiments of the apparatus and methods of the present invention are time synchronizing the devices 1500, 1504, 1508, 1512 in the background.

The resulting IEEE 1588 PTP wireless network group is configured such that no "hidden nodes" are allowed. Also, no station data forwarding (routing) is to be supported, and no mobile (come and leave coverage area) stations are to be supported. Security is to be implemented per 802.11i (a preferred method is WPA2).

FIG. 16 is a block diagram illustrating a simplified view of a wireless router having IEEE 1588 PTP master, boundary or optional transparent clock (IEEE 1588 PTP Version 2) support. The WAN Ethernet link 1600 contains the actual boundary clock hardware. Also, for each Ethernet LAN connection 1604, the IEEE 1588 PTP timestamp occurs between the PHY layer 1608 and the MAC layer 1612 within the Ethernet protocol stack 1616 or "switch fabric."

FIG. 17 is a block diagram illustrating the hierarchy of clocks utilized by the IEEE 1588 PTP in an exemplary embodiment of the present invention with various wired nodes 1700 in a LAN domain and various wireless stations 1704 in a WLAN domain connected by wired and wireless connections to a central router 1708. Routers 1708 such as the one illustrated in FIG. 17 having support for the IEEE 1588 PTP are commercially available.

Embodiments of the present invention provide for a plurality of similar or dissimilar metrology and/or other, non-metrology devices (e.g., robots, cameras, industrial equipment, etc.) to be relatively precisely synchronized in time so that the devices can accurately share data between them using both wired and wireless communications over a distributed network of the devices. The shared data may, for example, be measured data from the metrology devices. The time synchronization is preferably carried out using the IEEE 1588 PTP. As such, for precision metrology devices such as articulated arm coordinate measurement machines, laser trackers, etc., it is desirable that the network provide less than two microseconds of accuracy and less than 250 nanoseconds of peak-to-peak jitter between the router/boundary clock 1708 (FIG. 17) and all slave nodes 1700 and/or wireless stations 1704 for relatively precise metrology performance.

What has been described and illustrated so far is known as an "On Path" IEEE 1588 PTP implementation. That is all elements (e.g., router, nodes and stations) support IEEE 1588 PTP time stamping. Basically there is a grand master/boundary clock or master clock, or a network switch with transparent clock capability. Note that a transparent clock (an enhanced Ethernet switch and unique to IEEE 1588 PTP Version 2) measures and adjusts the PTP timestamps to account for packet delay within the switch. PTP messages are forwarded but modified for the residence time for the message to propagate from an ingress port to an egress port. Corrections must be made for both Sync_msg and Delay_Req messages. The dashed IEEE 1588 timestamp elements shown in FIG. 15 support this capability.

It is not necessary to implement all the PTP components described herein above. In a network comprising all or some standard Ethernet devices (little or no IEEE 1588 support) PTP can accurately be performed by using only a master and end node (slave). This may be accomplished by increasing the sync_msg and delay_req rate (up to 124 transactions/sec per IEEE 1588 PTP Version 2) and detecting "Lucky Packets" (minimum delay). A "Lucky Packet" algorithm, which is considered to be primarily a wired network improvement, can be used to improve the timing stability for the wired/wireless connection. This is done by detecting the minimum delays of "Lucky Packets" and using the results from these packets to make rate and time corrections. For more information, see National Semiconductor Corporation Application Note 1963 "*IEEE* 1588 *Synchronization over Standard Networks Using the DP*83640", which is incorporated herein by reference in its entirety. VLAN (virtual LAN—this is a communication between a group as if they were attached to the same broadcast domain) techniques can also be helpful. Further, it is not required that the boundary clock be resident within the wireless router. WLAN or LAN ports may be used for this access.

Referring to FIG. 18, there illustrated is a block diagram of the functions performed within a slave node device (e.g., a metrology device such as those described herein above) implementing the IEEE 1588 PTP. The node is either exclusively an Ethernet node (LAN configuration) or a WLAN station at any one time, but never both at the same time. What this means is that packets, including PTP packets, whether from a wired or wireless network are forced to share a common IEEE 1588 PHY device 1800, such as the model DP836450 from National Semiconductor Corporation. In essence, PTP packets are treated the same without regard to the media used (i.e., wired or wireless). That is, a LAN or WLAN connection uses the same IEEE 1588 PHY device 1800 whether the data is from a wired or a wireless connection. As such, the IEEE 1588 PTP packets or messages are timestamped in the same way regardless of whether it is a wired or wireless connection that the IEEE 1588 PHY device 1800 is dealing with. A LAN switch (multiplexer) 1804 determines which network as between the LAN (e.g., Ethernet) or WLAN (Wi-Fi) is selected. However, as far as the node is concerned it always appears as an Ethernet LAN. The timestamping algorithms used are invariant under either setup. For example a "Lucky Packet" algorithm would work the same regardless of media chosen.

Alternatively, the portable AACMM 100 itself may be programmed to capture data directly from the IEEE 1588 PHY device 1800. For example, an event timer can be set via a PTP clock to facilitate the data capture. Likewise trigger signals from internal or external sources may be timestamped as well.

The Ethernet wired LAN signal comes in from an Ethernet connector 1808, while the WLAN wireless connection comes in through an antenna 1812 and then into a wireless RF module 1816. The output of the IEEE 1588 PHY device 1800 is fed to a processing unit 1820. See also FIG. 3A for the IEEE 1588 PTP function 320 within the base processor board 204.

In an embodiment, the user interface 1824 may be a separate processor partitioned apart from processor 1820. This gives a number of advantages, including maintaining legacy configuration; that is, no RTOS is required for the base processor 204. Also, the relatively lowest cost can be obtained by using a base processor 204 implementation only. Further, the user interface and wireless functions can be located remote from base processor 204, and relatively simple serial interfaces can be implemented. In addition, it allows for the relatively best placement considering styling and function issues, and allows for modular development of hardware and software. Further, wireless communications is best kept as a separate function, and no real time performance hit occurs on the base processor 204 due to either or both of the two other modules. Finally, a TCP/IP stack would be required for the base processor 204.

Referring to FIG. 19, there illustrated is a more detailed block diagram of a hardware time stamp within an IEEE 1588 PTP PHY device.

Referring to FIG. 20, there illustrated is a functional diagram of timing control and external signal generation within an IEEE 1588 PTP PHY device. The model DP83640 available from National Semiconductor Corporation has an architecture that not only supports timestamping at the PHY level, but it also provides for a synchronized clock to be generated for external devices. This external clock nominal frequency can be any frequency related to 250 MHz divided by n, where n is an integer in the range of 2 to 255. This clock is generated by one of two selectable analog oscillators and offset by the rate information in the PTP_RATE registers. Therefore it is frequency accurate to the IEEE 1588 PTP clock time. Additionally it has no frequency jumps related to its reference frequency (125 MHz) as a phase accumulator derived signal would.

Referring to FIGS. 21 and 22, another feature of embodiments of the present invention is support for Synchronous Ethernet (SyncE). Synchronous Ethernet refers to clock recovery (and Phase Lock Loop filtering) from the receiving node and forward it to the nodes transmitting synchronization. Note that Synchronous Ethernet produces only frequency synchronization while PTP produces time and frequency synchronization. Synchronous Ethernet and the IEEE 1588 PTP can be employed concurrently on a wired Ethernet network (but not on the wireless network as there is no "upstream" clock). When the Synchronous Ethernet mode is enabled on PTP slave nodes (and only slave nodes) the time offset and jitter performance is improved. For more information, refer to National Semiconductor Corporation Application Note 1730, "*Synchronous Ethernet Mode: Achieving Sub-nanosecond Accuracy in PTP Applications*," which is incorporated by reference herein in its entirety.

Referring to FIG. 23, there illustrated is a wireless station that may include an embedded system 2300, a commercially available WIZnet WIZ610wi WLAN Wi-Fi module 2304, and a router 2308. The Wi-Fi module 2304 provides a means of bridging wired (Ethernet LAN) and wireless (WLAN) networks. Bridging is a forwarding technique used in packet-switched networks and no assumptions concerning network addresses are made (as in a router). The Wi-Fi module 2304 provides three interfaces: a low speed TTL serial (for device setup and status); an MII (MAC level Ethernet); and a wireless radio. From a system perspective, by connecting a non-IEEE 1588 PHY (i.e., a standard Ethernet PHY) to the MII interface (as in FIG. 18), a transition is made from Ethernet to wireless and back to Ethernet.

In the background section above, examples were given of applications in which relatively high time synchronization accuracy is needed when multiple metrology instruments are used together. One of these applications was discussed in detail herein above. The other applications are described further below.

Simultaneous multilateration: Simultaneous multilateration is a method of measuring with relatively high accuracy the position of a retroreflector target by simultaneously measuring the distance to the target using at least three, but preferably four, laser trackers. Laser trackers may contain either or both of two types of distance meters: interferometers and absolute distance meters. Usually the distance to the retroreflector target is measured using the tracker interferometer, but alternatively the ADM may be used. An example of multilateration using tracking interferometers is given in U.S. Pat. No. 4,457,625 to Greenleaf.

Radial distances, which are found by interferometers or absolute distance meters in laser trackers, are usually at least five times more accurate than transverse distances, which are found by the angle measuring devices in trackers. For this reason, simultaneous multilateration, which relies on radial distance measurements, is more accurate than tracker measurements based on angle readings.

Synchronization is not important for simultaneous multilateration of a stationary retroreflector target. However, for multilateration of a moving target, accurate synchronization is essential. For example, suppose that the target moves at one meter per second and synchronization is accurate to five milliseconds. The resulting error in 3-D position is then on the order of five mm, which is relatively too large for this application. If, on the other hand, the synchronization were accurate to ten microseconds, the error would be on the order of ten micrometers, and this error could be further reduced by using Kalman filtering or similar methods. Embodiments of the present invention utilizing the IEEE 1588 PTP would enable this improved synchronization.

Wireless synchronization: As described herein above, it is common to attach a scanner to the end of an AACMM. The scanned data provided by the scanner must be synchronized to data collected by the angular encoders within the AACMM. Since wires are used to make these connections and since the electronics may be controlled by a single master clock, relatively accurate synchronization is possible. In the future, however, the very high data rates collected by scanners will likely make it difficult to transfer the large quantity of data through a small number of wires. In addition, the use of dedicated wires through the arm segments limits flexibility in attaching different types of devices to the end of the arm. A better method is to use a high speed, yet accurately synchronized, method of wireless data transfer, which embodiments of the present invention provide.

Compensation and calibration of mid-range scanner: A scanner is a device that measures the 3-D coordinates of objects by scanning a source of light over the surfaces of interest. A mid-range laser scanner is a scanner that measures to a maximum distance of anywhere from a few meters to a few hundred meters. Scanners operating over this range have a need for compensation and calibration of their distance sensor. For example, the distance measured by such scanners may depend on the power of light returning to the scanner or it may vary periodically as a function of distance from the scanner to the target. Such variations in distance can be corrected by means of compensation parameters entered into the firmware or software of the scanner. To obtain these compensation parameters, a diffuse target having known characteristics may be mounted on a carriage that sits on a rail. This carriage may be moved by hand along the rail or, preferably, automatically moved by means of a motor. On the backside of the diffuse target, a retroreflector may be mounted for measurement by a device such as a laser tracker. To make the collection of data as convenient as possible, it should be possible to step the target quickly from point to point or, preferably, in a continuous motion. This is possible if synchronization between the scanner and tracker is highly accurate, for example, to about ten microseconds. Besides compensation of the scanner, it is also necessary to calibrate the laser scanner. Calibration is the procedure by which the performance of the scanner is verified. The same setup described above can be used for calibration as well as compensation, although the conditions should be varied slightly to ensure that the corrections are being properly applied over all scanner ranges.

Compensation of an AACMM: A two-part method is commonly used to compensate AACMMs. The first part of the method is to place the spherical probe tip that is attached to the end of the arm into a conical seat or three-point spherical nest. The different segments of the arm are then rotated to multiple different positions to fully exercise the angular encoders within the arm over their full range of motion. The second part of the method is to measure one or more calibrated scale bars. With the information obtained from these two parts, parameters can be obtained for the arm segment (link) lengths, zero-angle of each encoder, joint offset, and the like. An alternative method that may improve arm accuracy is to use the laser tracker to measure the position of a retroreflector as the different segments of the arm are rotated to multiple different positions. For this method to be feasible, it is necessary to synchronize the readings of the tracker and arm very precisely.

Some of the advantages of embodiments of the present invention include: (1) the resulting network supports any mix of wired/wireless media (where "wired" media may include not only traditional physical wires or the like but also optical fibers); (2) all nodes support the IEEE 1588 Precision Time Protocol; (3) timing accuracy of less than one microsecond between nodes/stations and the router/boundary clock is achievable; (4) industrial networks such as Ethernet/IP, Powerelink, EtherCAT and PROFIINET can be supported; (5) multiple concurrent measurement applications can be run; (6) a single host interface is supported; (7) network storage and buffering can be included; (8) a single "measurement" domain (one boundary clock, unified in the wired and wireless network) removes accuracy issues when hierarchical boundary clocks are employed; (9) Synchronous Ethernet (SyncE) mode can be selected in PTP slaves; (10) support for an external grand master clock is supported, including but not limited to GPS; (11) provides multi-band solution for high bandwidth applications (scanners); (12) topology can be extended to other metrology applications; (13) future use of 802.11n (MIMO—multi-antenna) with IEEE 1588 PTP capability can be easily integrated.

A 3D robot scanner may be used to inspect heat shields. A solution using the IEEE 1588 PTP to synchronize a laser line probe and a commercial robot could be employed. The software may control the robot and display and patch 3D scans in real time, thereby providing zooming, measurement of defects and ablator recession rate analysis (surface degradation under stress).

Embodiments of the method and apparatus of the present invention provide for relatively accurate time synchronization of measurements by multiple metrology devices such as articulated arm coordinate measuring machines, laser trackers, and other precision metrology devices and even non-metrology devices such as robots, cameras and industrial equipment. Use of the IEEE 1588 Precision Time Protocol greatly reduces time synchronization delay by using one master clock for all linked devices, slave clocks for the remaining linked devices, a timestamp routine, and by accounting for delays and offsets. The goal is to achieve synchronization to better than 500 nanoseconds in operation.

Further, to be completely flexible, the synchronization is available over both wired and wireless media. When this is accomplished, portable AACMMs can be easily mixed and joint 3-D measurements may be made. The technique presented herein is applied to portable metrology equipment such as AACMMs and laser trackers. However, it may be extended to other types of metrology devices such as those using Actual Time of Flight (ATOF) or Difference of Time of Arrivals (DTOA) methods.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. Apparatus including at least two metrology devices that communicate with each other in a bidirectional manner, the apparatus comprising:
    a first one of the at least two metrology devices having an IEEE 1588 precision time protocol interface, the interface including one or more components configured for bidirectional communications in both a wired manner and a wireless manner with a second one of the at least two metrology devices;
    the second one of the at least two metrology devices having an IEEE 1588 precision time protocol interface, the interface including one or more components configured for bidirectional communications in both a wired manner and a wireless manner with the first one of the at least two metrology devices;
    wherein one of the at least two metrology devices includes a master clock and the other one of the at least two metrology devices includes a slave clock, wherein the master clock communicates a time to the slave clock and the slave clock is responsive to the communicated time from the master clock to adjust a time of the slave clock if necessary to substantially correspond to the time of the master clock, thereby time synchronizing the at least two metrology devices together; and
    wherein each metrology device measures a parameter and wherein the measurements made by each metrology device occur in a time synchronized manner as a result of the time of the slave clock substantially corresponding to the time of the master clock.

2. The apparatus of claim 1, wherein the at least two metrology devices are connected in a distributed network.

3. The apparatus of claim 1, wherein the wired communications occur over an Ethernet local area network.

4. The apparatus of claim 1, wherein the wireless communications occur over a Wi-Fi network.

5. The apparatus of claim 1, wherein each metrology device comprises a device from the group that includes an articulated arm coordinate measuring machine (AACMM), an AACMM having a scanner attached thereto, a laser tracker, and a laser scanner.

6. The apparatus of claim 1, wherein each metrology device comprises a device from the group that includes an articulated arm coordinate measuring machine (AACMM) having a scanner attached thereto and a laser tracker, wherein each of the AACMM and the laser tracker track the position of the scanner attached to the AACMM.

7. The apparatus of claim 6, wherein each of the AACMM and the laser tracker tracks the position of the scanner attached to the AACMM during one of an AACMM relocation procedure or an AACMM calibration procedure.

8. The apparatus of claim 2, wherein the distributed network comprises one from the group that includes a real time industrial network and an enterprise network.

9. The apparatus of claim 2, wherein the distributed network comprises one from the group that includes an infrastructure network and an ad hoc network.

10. The apparatus of claim 1, further comprising a router that connects in a wired and/or wireless manner with each one of the at least two metrology devices, wherein the router includes an IEEE 1588 precision time protocol interface.

11. The apparatus of claim 1, wherein the wired communications occur over an Ethernet local area network in a Synchronous Ethernet manner.

12. The apparatus of claim 1, wherein the IEEE 1588 precision time protocol interface within each of the two metrology devices implements hardware assisted timestamping.

13. The apparatus of claim 1, wherein the IEEE 1588 precision time protocol interface within each of the two metrology devices further comprises a switch having at a first input thereof a wired connection from the other one of the at least two metrology devices and having at a second input thereof a wireless connection from the other one of the at least two metrology devices, wherein the wireless connection from the other one of the at least two metrology devices includes one or more components that convert the wireless connection to a wired connection that is applied to the second input of the switch.

14. The apparatus of claim 1, wherein the IEEE 1588 precision time protocol interface within each of the two metrology devices implements hardware assisted timestamping such that when the master clock communicates a time to the slave clock and the slave clock is responsive to the communicated time from the master clock to adjust a time of the slave clock if necessary to correspond to the time of the master clock with a difference between the time of the master clock and the time of the slave clock being no greater than 500 nanoseconds.

15. A method for communicating between at least two metrology devices in a bidirectional manner, the method comprising the steps of:

providing a first one of the at least two metrology devices with an IEEE 1588 precision time protocol interface configured for bidirectional communications in both a wired manner and a wireless manner with a second one of the at least two metrology devices;

providing the second one of the at least two metrology devices with an IEEE 1588 precision time protocol interface configured for bidirectional communications in both a wired manner and a wireless manner with the first one of the at least two metrology devices;

wherein one of the at least two metrology devices includes a master clock and the other one of the at least two metrology devices includes a slave clock, the master clock communicating a time to the slave clock and the slave clock is responsive to the communicated time from the master clock for adjusting a time of the slave clock if necessary to substantially correspond to the time of the master clock, thereby time synchronizing the at least two metrology devices together; and wherein each metrology device measures a parameter and wherein the measurements made by each metrology device occur in a time synchronized manner as a result of the time of the slave clock substantially corresponding to the time of the master clock.

16. The method of claim 15, further comprising connecting the at least two metrology devices in a distributed network.

17. The method of claim 15, wherein the wired communications occur over an Ethernet local area network.

18. The method of claim 15, wherein the wireless communications occur over a Wi-Fi network.

19. The method of claim 15, wherein each metrology device comprises a device from the group that includes an articulated arm coordinate measuring machine (AACMM), an AACMM having a scanner attached thereto, a laser tracker, and a laser scanner.

20. The method of claim 15, wherein each metrology device comprises a device from the group that includes an articulated arm coordinate measuring machine (AACMM) having a scanner attached thereto and a laser tracker, further comprising each of the AACMM and the laser tracker tracking the position of the scanner attached to the AACMM.

21. The method of claim 20, further comprising each of the AACMM and the laser tracker tracking the position of the scanner attached to the AACMM during one of an AACMM relocation procedure or an AACMM calibration procedure.

22. The method of claim 16, wherein the distributed network comprises one from the group that includes a real time industrial network and an enterprise network.

23. The method of claim 16, wherein the distributed network comprises one from the group that includes an infrastructure network and an ad hoc network.

24. The method of claim 15, further comprising a router that connects in a wired and/or wireless manner with each one of the at least two metrology devices, wherein the router includes an IEEE 1588 precision time protocol interface.

25. The method of claim 15, wherein the wired communications occur over an Ethernet local area network in a Synchronous Ethernet manner.

26. The method of claim 15, wherein the IEEE 1588 precision time protocol interface within each of the two metrology devices implements hardware assisted timestamping.

27. The method of claim 15, wherein the IEEE 1588 precision time protocol interface within each of the two metrology devices further comprises a switch having at a first input thereof a wired connection from the other one of the at least two metrology devices and having at a second input thereof a wireless connection from the other one of the at least two metrology devices, wherein the wireless connection from the other one of the at least two metrology devices includes one or more components that convert the wireless connection to a wired connection that is applied to the second input of the switch.

28. The method of claim 15, wherein the IEEE 1588 precision time protocol interface within each of the two metrology devices implements hardware assisted timestamping such that when the master clock communicates a time to the slave clock and the slave clock is responsive to the communicated time from the master clock to adjust a time of the slave clock if necessary to correspond to the time of the master clock with a difference between the time of the master clock and the time of the slave clock being no greater than 500 nanoseconds.

29. A computer program product for implementing communications between at least two metrology devices in a bidirectional manner, the computer program product comprising a non-transitory storage medium having computer readable program code embodied thereon, which when executed by a computer causes the computer to implement a method, the method including the steps of:
   providing a first one of the at least two metrology devices with an IEEE 1588 precision time protocol interface configured for bidirectional communications in both a wired manner and a wireless manner with a second one of the at least two metrology devices;
   providing the second one of the at least two metrology devices with an IEEE 1588 precision time protocol interface configured for bidirectional communications in both a wired manner and a wireless manner with the first one of the at least two metrology devices;
   wherein one of the at least two metrology devices includes a master clock and the other one of the at least two metrology devices includes a slave clock, the master clock communicating a time to the slave clock and the slave clock is responsive to the communicated time from the master clock for adjusting a time of the slave clock if necessary to substantially correspond to the time of the master clock, thereby time synchronizing the at least two metrology devices together; and
   wherein each metrology device measures a parameter and wherein the measurements made by each metrology device occur in a time synchronized manner as a result of the time of the slave clock substantially corresponding to the time of the master clock.

30. The computer program product of claim 29, in which the method further comprises connecting the at least two metrology devices in a distributed network.

31. The computer program product of claim 29, wherein the wired communications occur over an Ethernet local area network.

32. The computer program product of claim 29, wherein the wireless communications occur over a Wi-Fi network.

33. The computer program product of claim 29, wherein each metrology device comprises a device from the group that includes an articulated arm coordinate measuring machine (AACMM), an AACMM having a scanner attached thereto, a laser tracker, and a laser scanner.

34. The computer program product of claim 29, wherein each metrology device comprises a device from the group that includes an articulated arm coordinate measuring machine (AACMM) having a scanner attached thereto and a laser tracker, further comprising each of the AACMM and the laser tracker tracking the position of the scanner attached to the AACMM.

35. The computer program product of claim 34, in which the method further comprises each of the AACMM and the laser tracker tracking the position of the scanner attached to the AACMM during one of an AACMM relocation procedure or an AACMM calibration procedure.

36. The computer program product of claim 30, wherein the distributed network comprises one from the group that includes a real time industrial network and an enterprise network.

37. The computer program product of claim 30, wherein the distributed network comprises one from the group that includes an infrastructure network and an ad hoc network.

38. The computer program product of claim 29, further comprising a router that connects in a wired and/or wireless manner with each one of the at least two metrology devices, wherein the router includes an IEEE 1588 precision time protocol interface.

39. The computer program product of claim 29, wherein the wired communications occur over an Ethernet local area network in a Synchronous Ethernet manner.

40. The computer program product of claim 29, wherein the IEEE 1588 precision time protocol interface within each of the two metrology devices implements hardware assisted timestamping.

41. The computer program product of claim 29, wherein the IEEE 1588 precision time protocol interface within each of the two metrology devices further comprises a switch having at a first input thereof a wired connection from the other one of the at least two metrology devices and having at a second input thereof a wireless connection from the other one of the at least two metrology devices, wherein the wireless connection from the other one of the at least two metrology devices includes one or more components that convert the wireless connection to a wired connection that is applied to the second input of the switch.

42. The computer program product of claim 29, wherein the IEEE 1588 precision time protocol interface within each of the two metrology devices implements hardware assisted timestamping such that when the master clock communicates a time to the slave clock and the slave clock is responsive to the communicated time from the master clock to adjust a time of the slave clock if necessary to correspond to the time of the master clock with a difference between the time of the master clock and the time of the slave clock being no greater than 500 nanoseconds.

* * * * *